United States Patent [19]

Oxley

[11] Patent Number: 4,684,990
[45] Date of Patent: Aug. 4, 1987

[54] METHOD AND APPARATUS FOR COMBINING MULTIPLE VIDEO IMAGES IN THREE DIMENSIONS

[75] Inventor: Leslie J. Oxley, Redwood City, Calif.

[73] Assignee: Ampex Corporation, Redwood City, Calif.

[21] Appl. No.: 722,893

[22] Filed: Apr. 12, 1985

[51] Int. Cl.$^4$ .................. H04N 5/262; H04N 13/00; H04N 13/02

[52] U.S. Cl. .................................... 358/183; 358/180; 358/88; 358/92; 358/22; 340/729; 364/522

[58] Field of Search .................. 358/88, 3, 31, 32, 22, 358/181, 182, 183, 185, 2, 90, 138; 364/522; 340/729, 747

[56] References Cited

U.S. PATENT DOCUMENTS

| 2,974,190 | 3/1961 | Geiger | 358/22 |
|---|---|---|---|
| 3,778,542 | 12/1973 | Hanseman | 358/22 |
| 4,472,732 | 9/1984 | Bennett et al. | 358/22 |

FOREIGN PATENT DOCUMENTS

| 1495344 | 12/1977 | United Kingdom . |
| 2063616A | 6/1981 | United Kingdom . |
| 2155729A | 9/1985 | United Kingdom . |

OTHER PUBLICATIONS

Appel, Arthur, "The Notion of Quantitative Invisibility and the Machine Rendering of Solids," Proceedings A.C.M. National Meeting, 1967, pp. 387-393.
Wylie, Chris Gordon Romney, David Evans and Alan Erdahl, "Half-Tone Perspective Drawings by Computer," Fall Joint Computer Conference, 1967, pp. 49-58.
Sproull, Robert F. and Ivan E. Sutherland, "A Clipping Divider," Fall Joint Computer Conference, 1968, pp. 765-775.
Galimberti, R. and U. Montanari, "An Algorithm for Hidden Line Elimination," Communications of the ACM, vol. 12, No. 4, Apr. 1969, pp. 206-211.
Loutrel, Philippe P., "A Solution to the Hidden-Line Problem for Computer-Drawn Polyhedra," IEEE Transactions on Computers, vol. C-19, No. 3, Mar. 1970 pp. 205-213.

(List continued on next page.)

Primary Examiner—Howard W. Britton
Assistant Examiner—John K. Peng
Attorney, Agent, or Firm—Robert K. Schumacher; Joel D. Talcott

[57] ABSTRACT

A plurality of input video signals (including background) are combined in accordance with priority. Each video signal comprises data samples corresponding to respective discrete locations on a viewing plane. The signals are preferably from an ADO transformation system wherein such data samples correspond to elements of an image lying in an image plane displaced from the viewing plane. Input key signals correspnding to respective locations are associated with respective input signals. Priority is shown determined from respective sets of plane defining signals as a sequence of depth signals corresponding to the depth coordinates of the respective image plane at the respective locations. The depth signals are used to produce respective weighting signals. The weighting signals and respective input key signals are used to produce in respect to each input video signal a set of processed key signals corresponding to respective coordinate locations on the viewing plane in the respective sequence, each set of processed key signals indicating the weighted portion of the respective data samples to be included in a combined video signal at each respective coordinate location. Corresponding data samples are cut by respective processed key signals to produce weighted data samples in respect to each input video signal in the respective sequence. The weighted data samples of the plurality of input video signals for each respective coordinate location on the viewing plane are combined in the respective sequence to produce a combined output video signal.

26 Claims, 15 Drawing Figures

OTHER PUBLICATIONS

Bouknight, W. Jack, "A Procedure for Generation of Three-Dimensional Half-Toned Computer Graphics Presentations," Communications of the ACM, vol. 13, No. 9, Sep. 1970, pp. 527-536.

Gouraud, Henri, "Continuous Shading of Curved Surfaces," IEEE Transactions on Computers, vol. C-20, No. 6, Jun. 1971, pp. 623-629.

Sutherland, Ivan E., Robert F. Sproull and Robert A. Schumacker, "Sorting and the Hidden-Surface Problem," National Computer Conference, 1973, pp. 685-693.

Sutherland, Ivan E., Robert F. Sproull and Robert A. Schumacker, "A Characterization of Ten Hidden-Surface Algorithms," Evans & Sutherland Computer Corporation, about 1973.

Newman, W. M. and R. F. Sproull, Principles of Interactive Computer Graphics, Second Edition, McGraw-Hill, 1979, Chapter 23, pp. 356-357, and Chapter 24, pp. 368-373.

Foley, J. D., and A. Van Dam, "Fundamentals of Interactive Computer Graphics," Addison-Wesley, 1982, Reprinted with Corrections 1983, Chapter 15, pp. 553-573.

ADO Ampex Digital Electronics Service Manual Catalog No. 1809550-03, Nov. 1983, Section 1, pp. 1-1 to 1-4; Section 3, pp. 3-1 to 3-8; Section 5, pp. 5-1 to 5-40.

ADO Concentrator Service Manual Catalog No. 1809633-01, Apr. 1984, Section 1, pp. 1-1 to 1-5, and Section 3, pp. 3-1 to 3-55.

Fichera, Richard, "Rendering Adds Realism to Graphics," Electronics Week, Oct. 22, 1984, pp. 89-93.

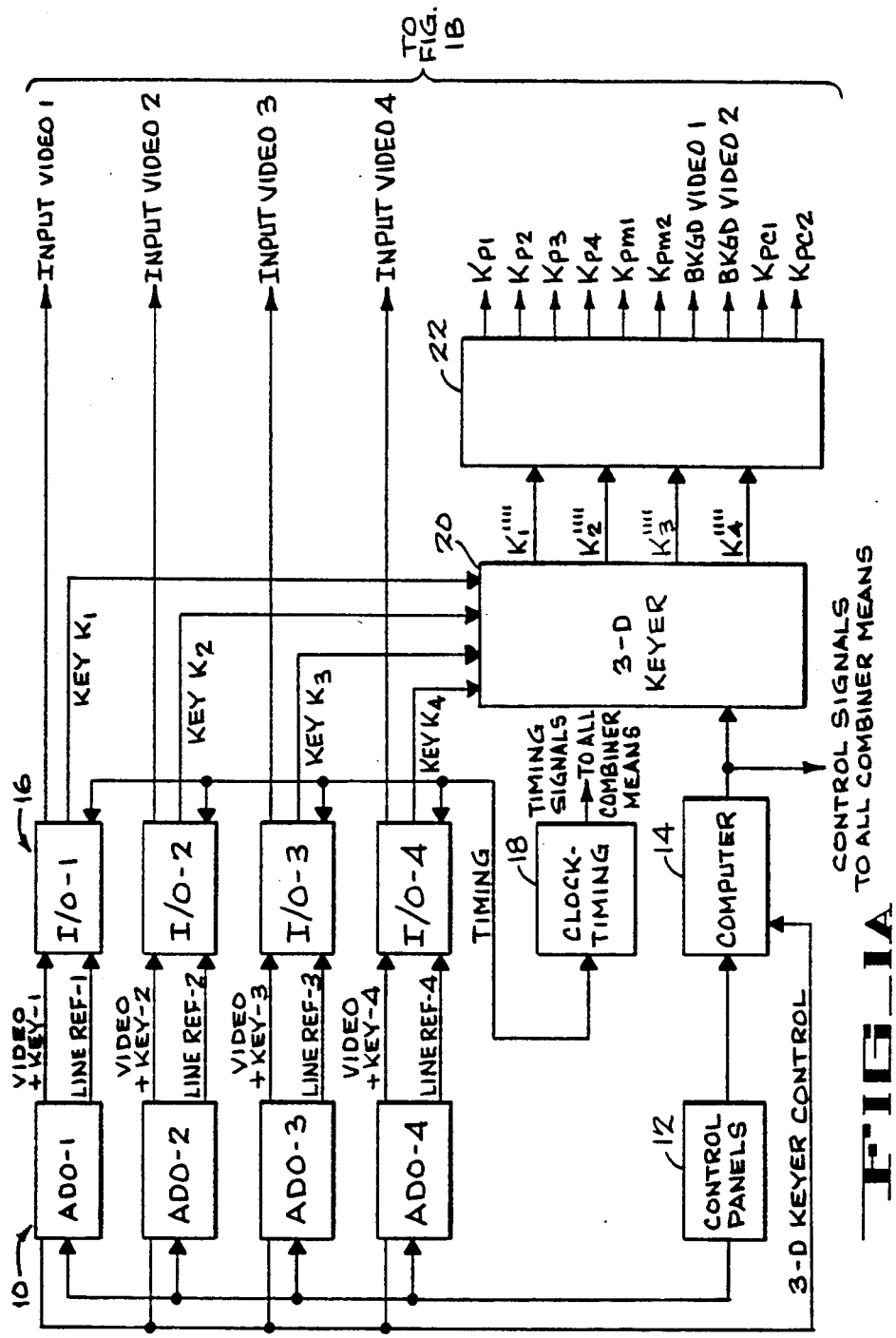
FIG_1A

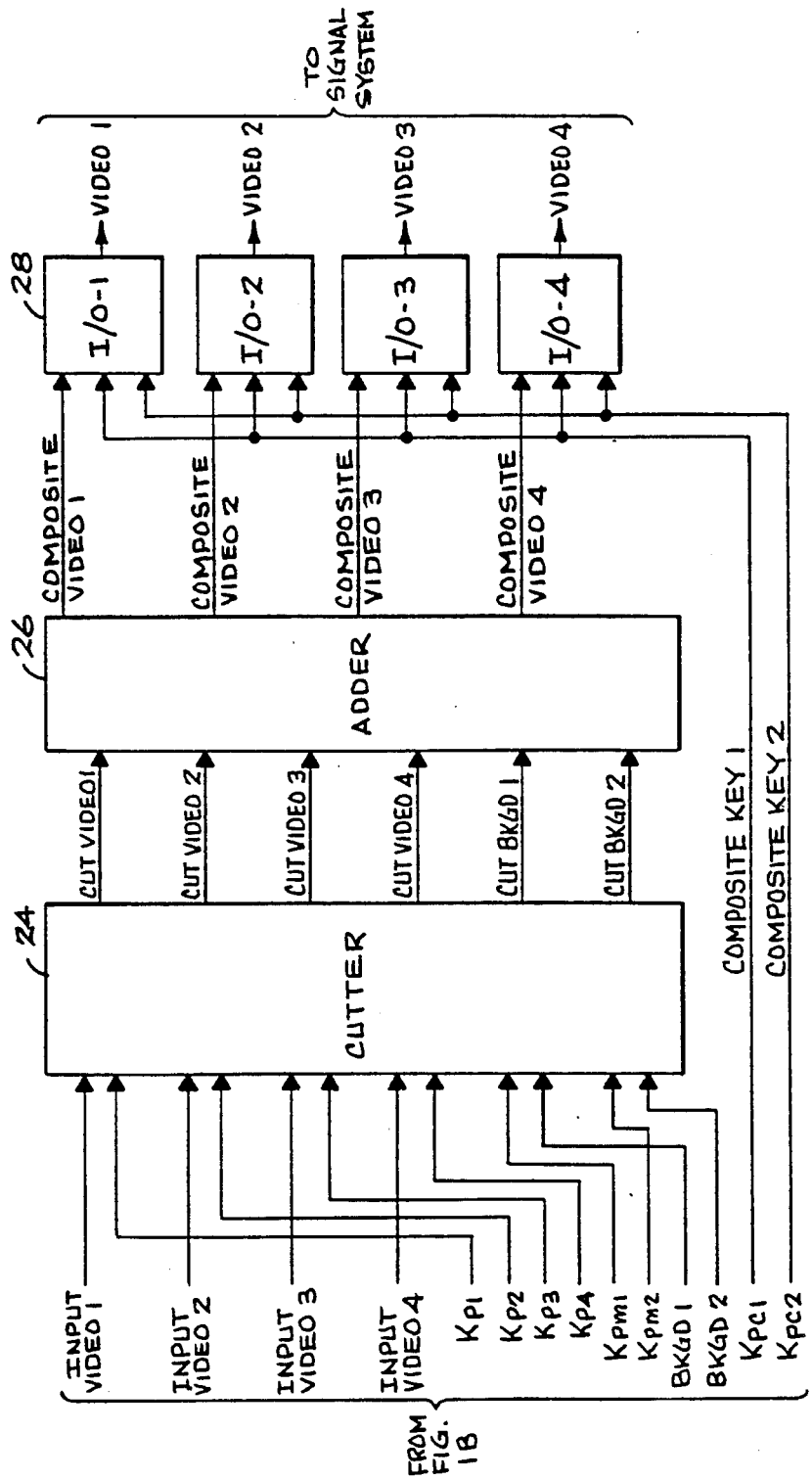

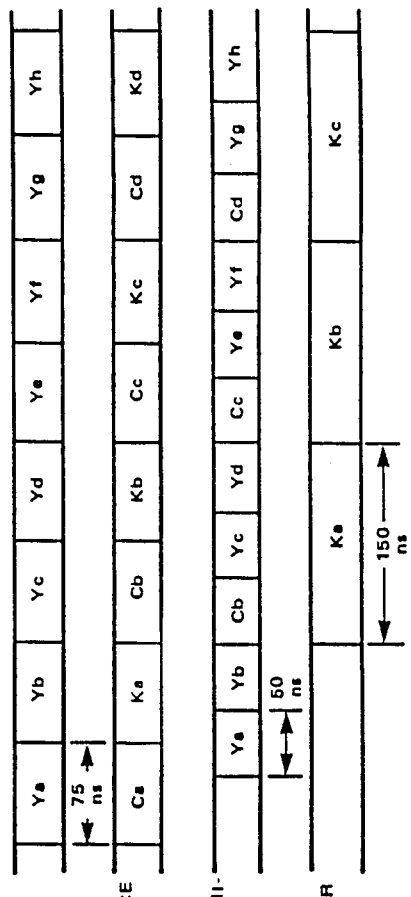
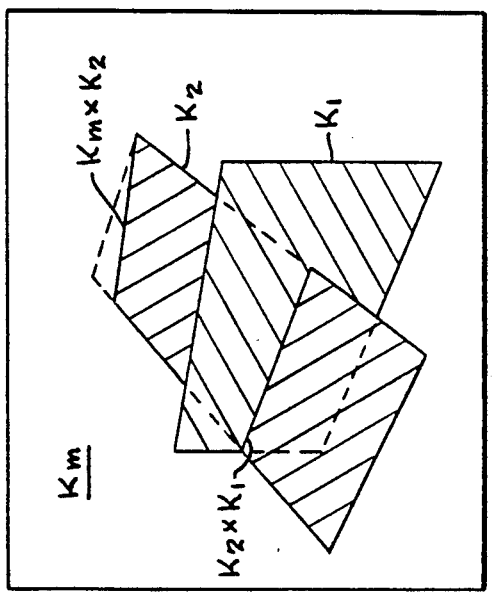
FIG_2
FIG_3
A ADO LUMINANCE BYTES
B ADO CHROMINANCE AND KEY BYTES
C CONCENTRATOR LUMINANCE AND CHROMINANCE BYTES
D CONCENTRATOR KEY BYTES

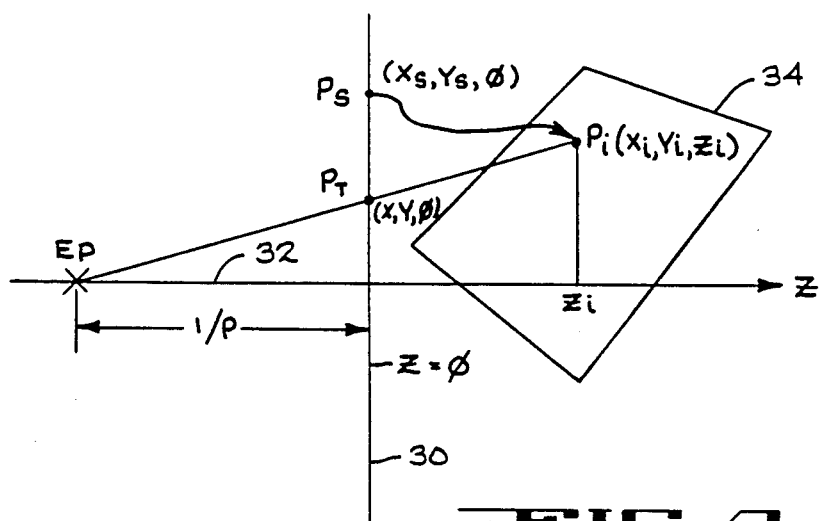
FIG_4
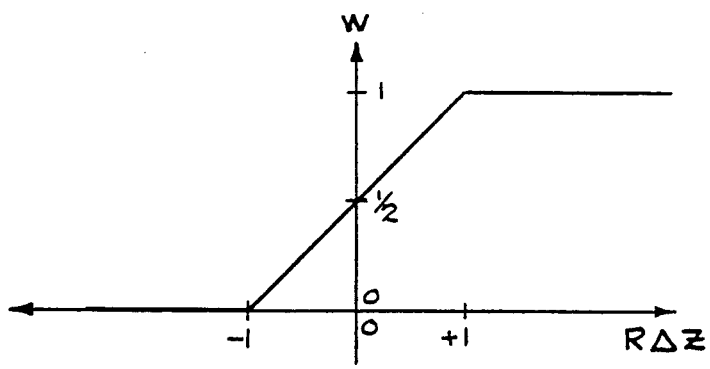
FIG_7

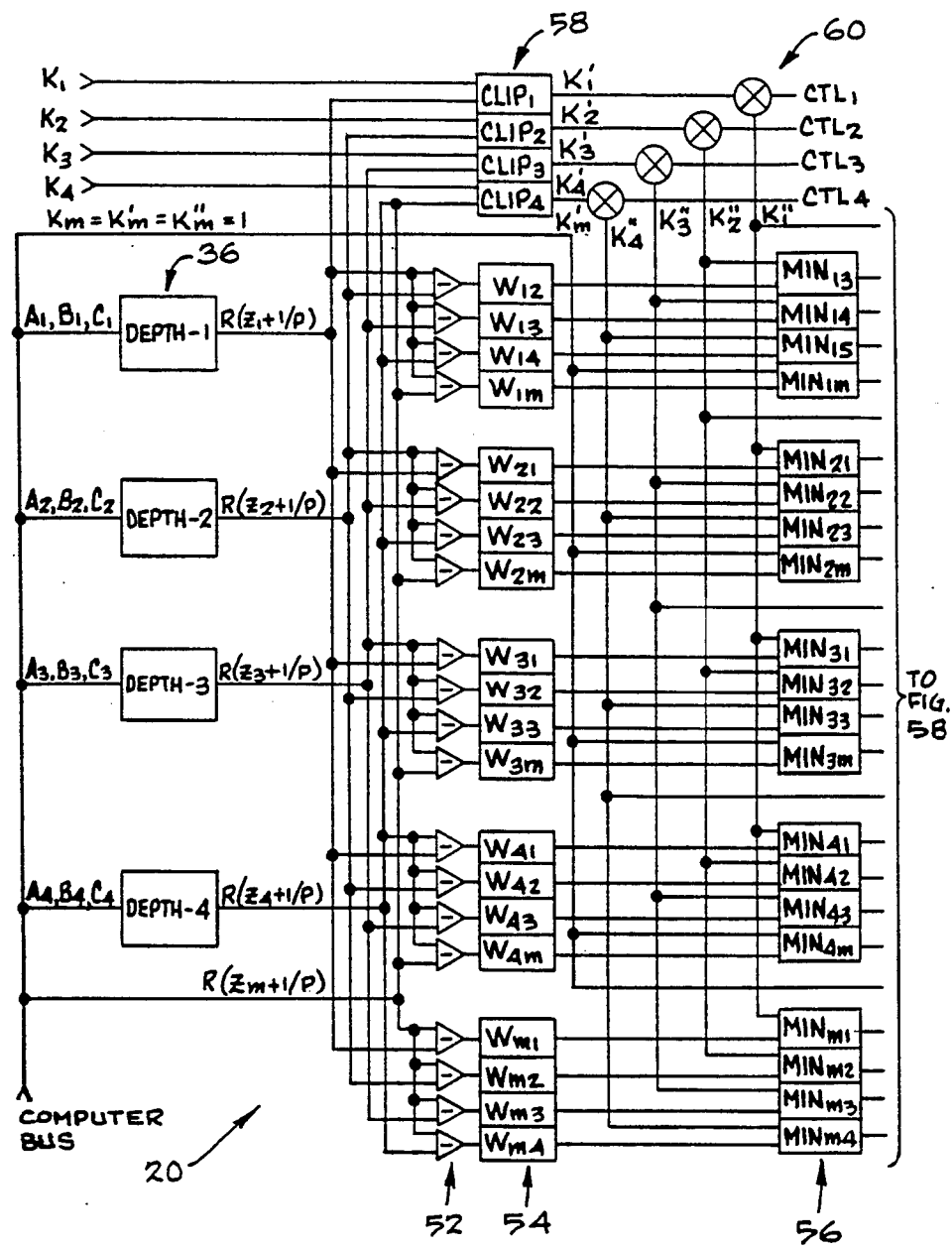
FIG_5A

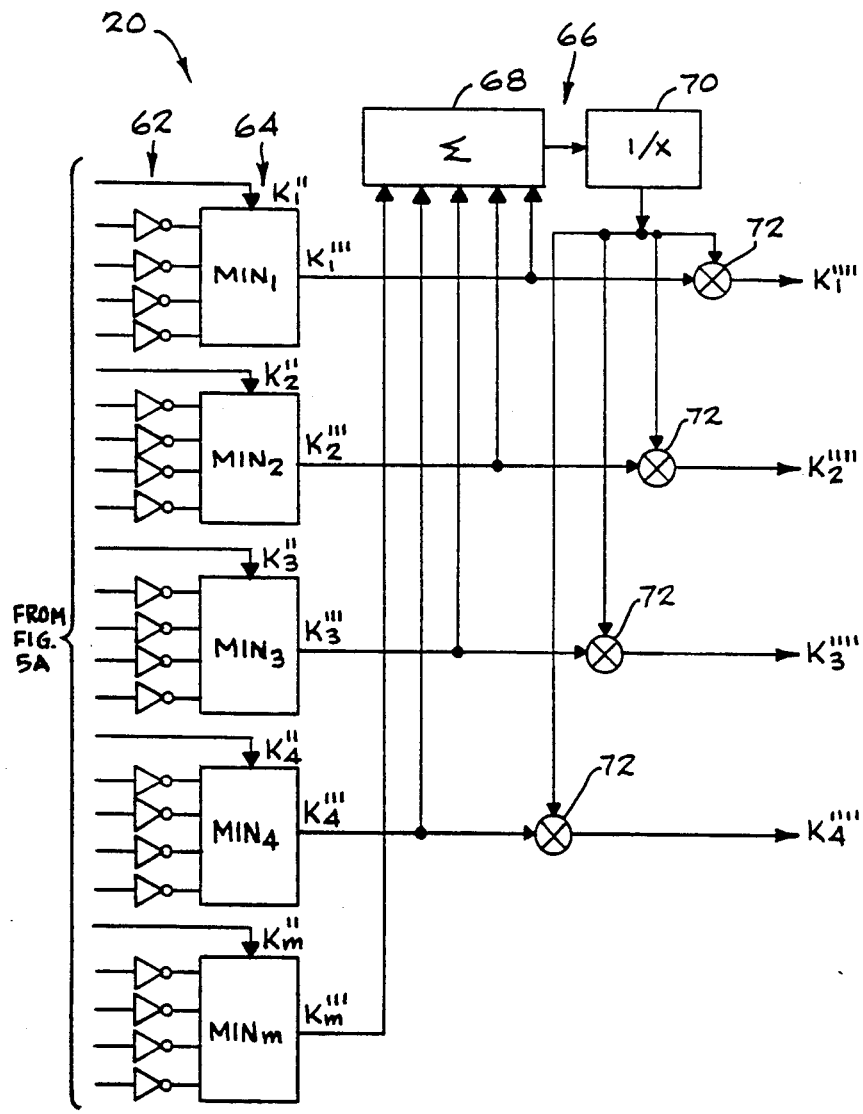
FIG_5B

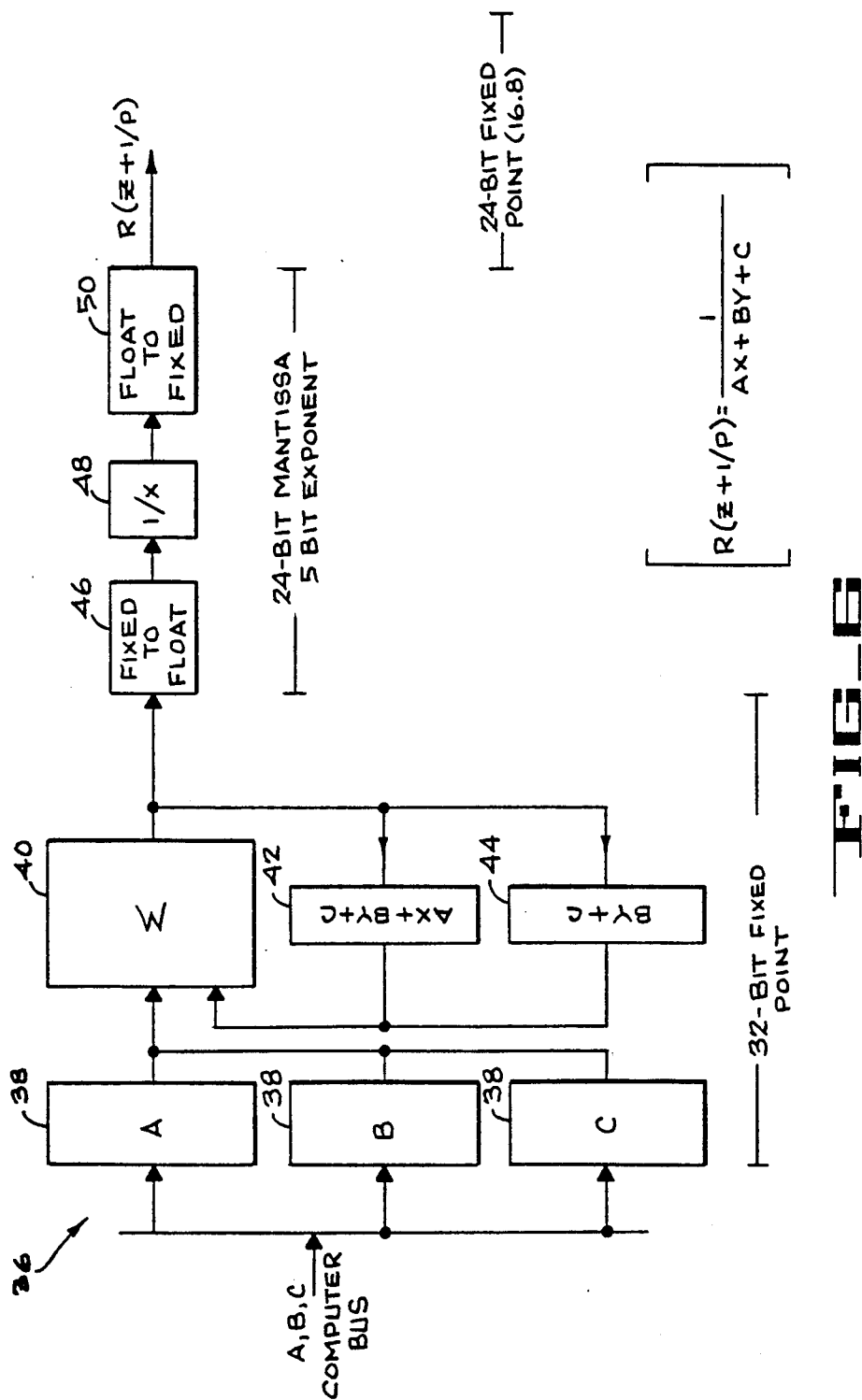
FIG_6

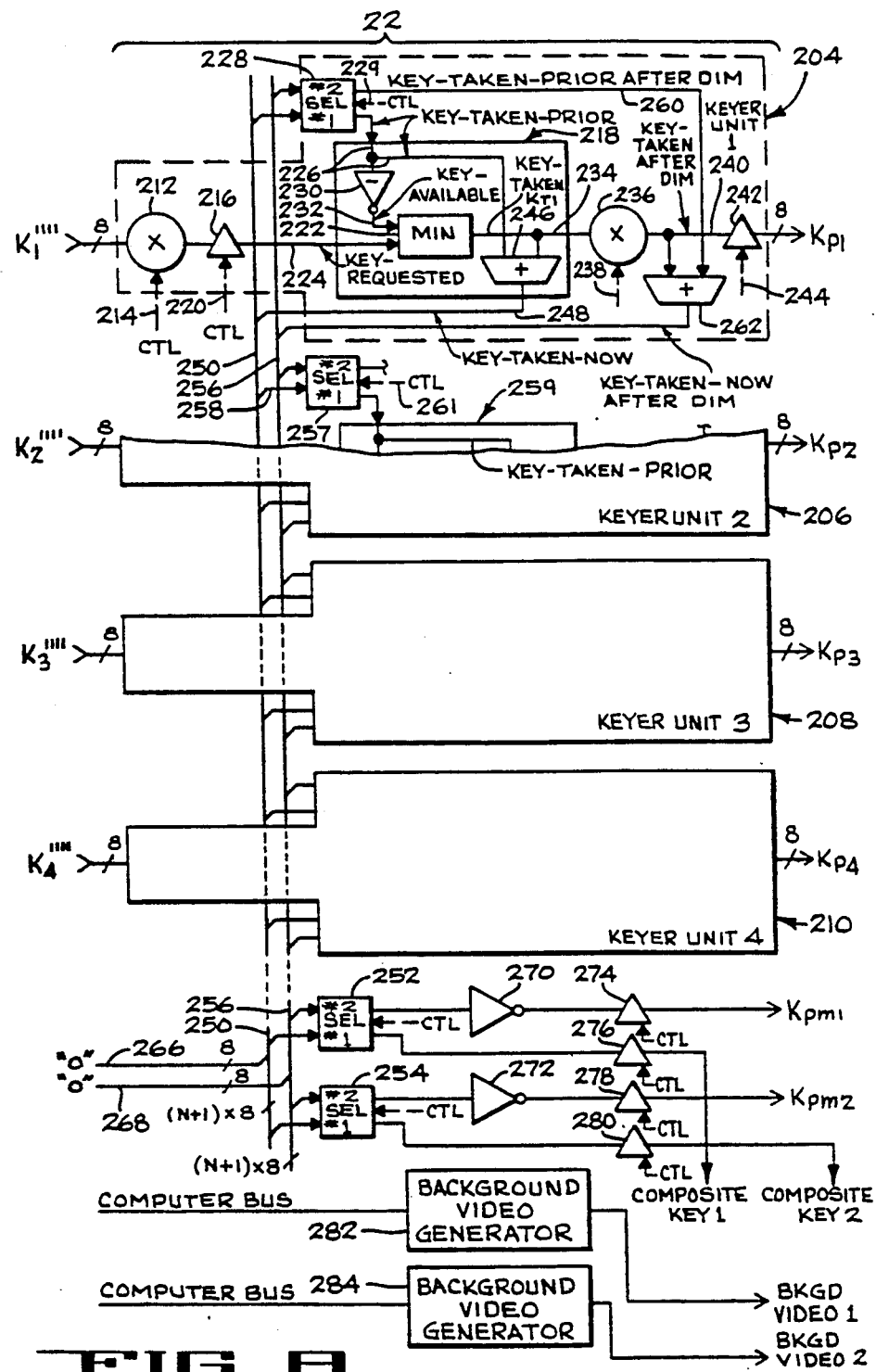
FIG_8

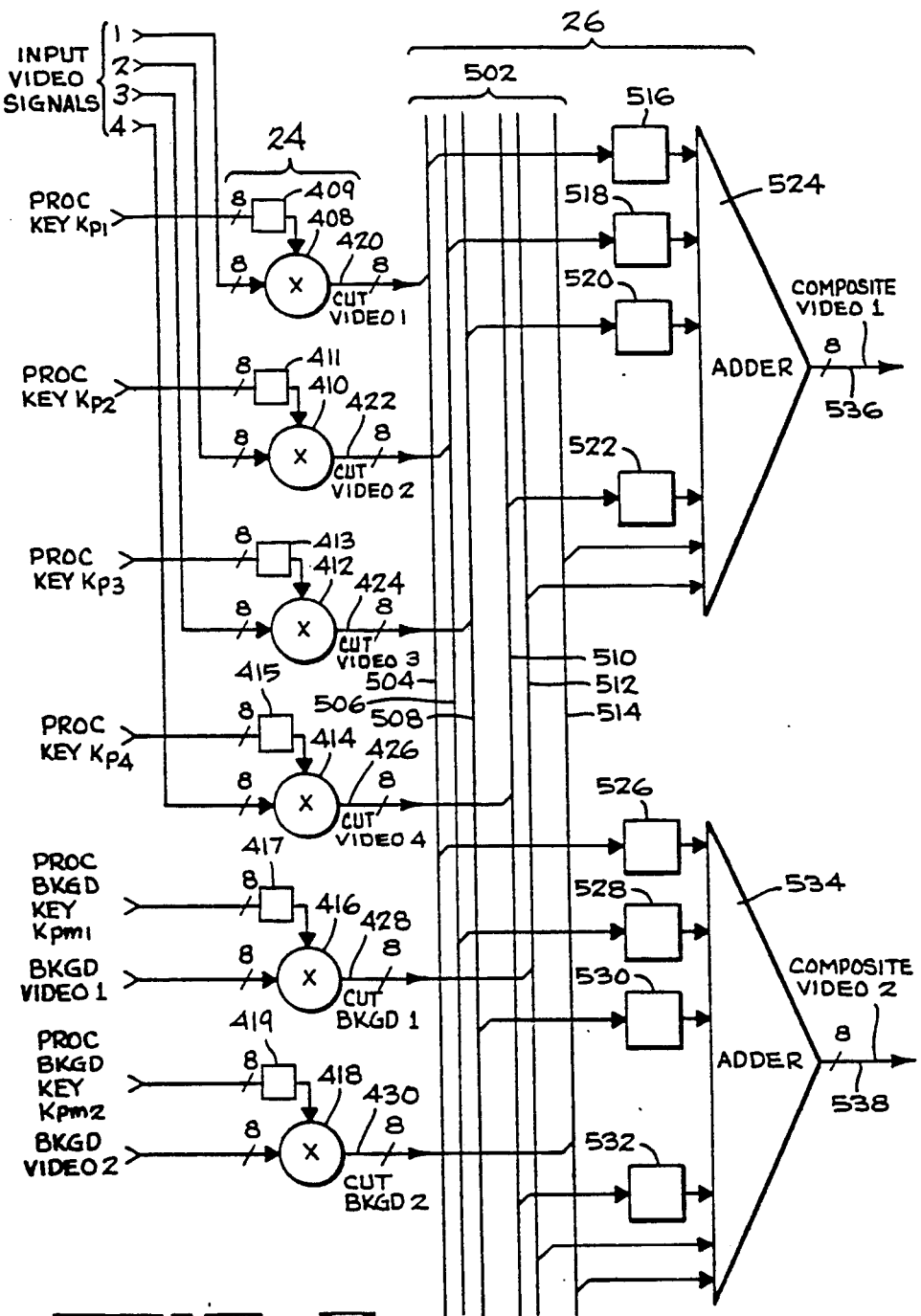
FIG_9

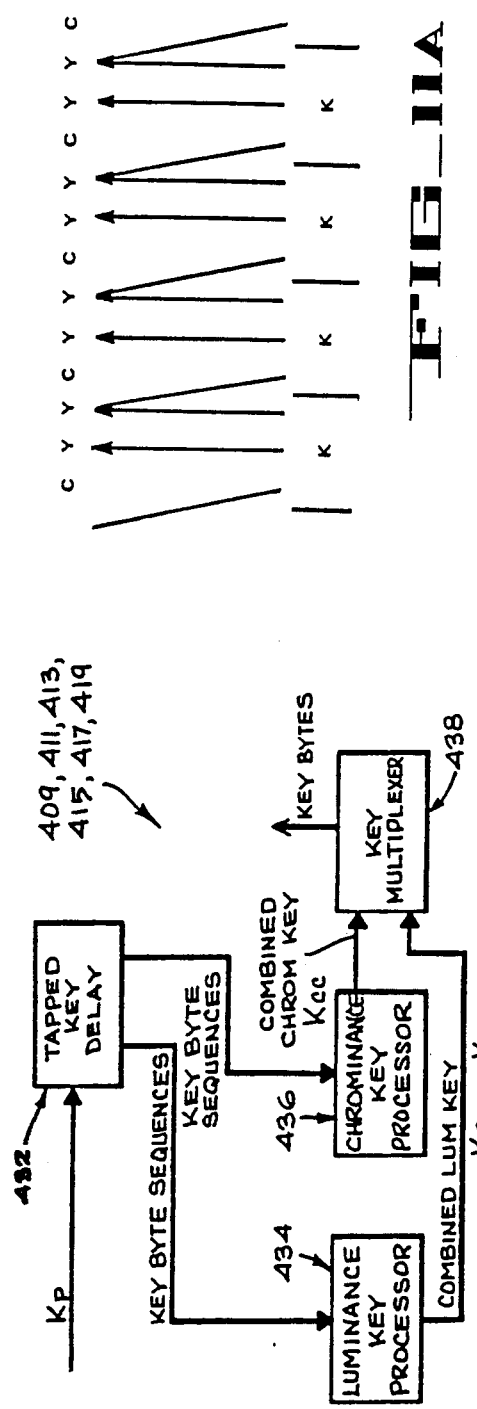
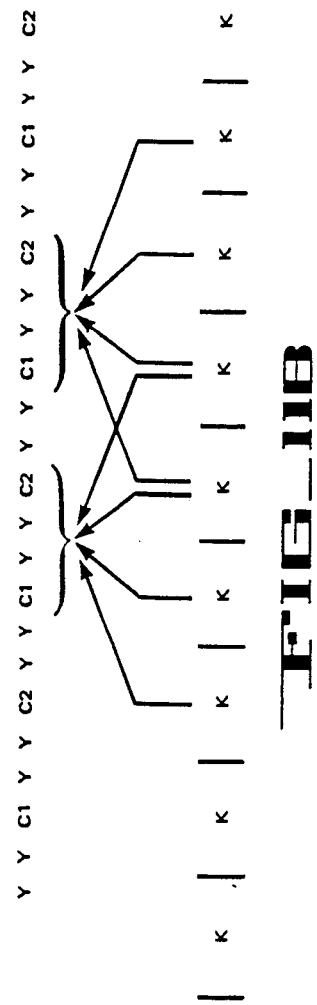
FIG._11A
FIG._11B
FIG._10

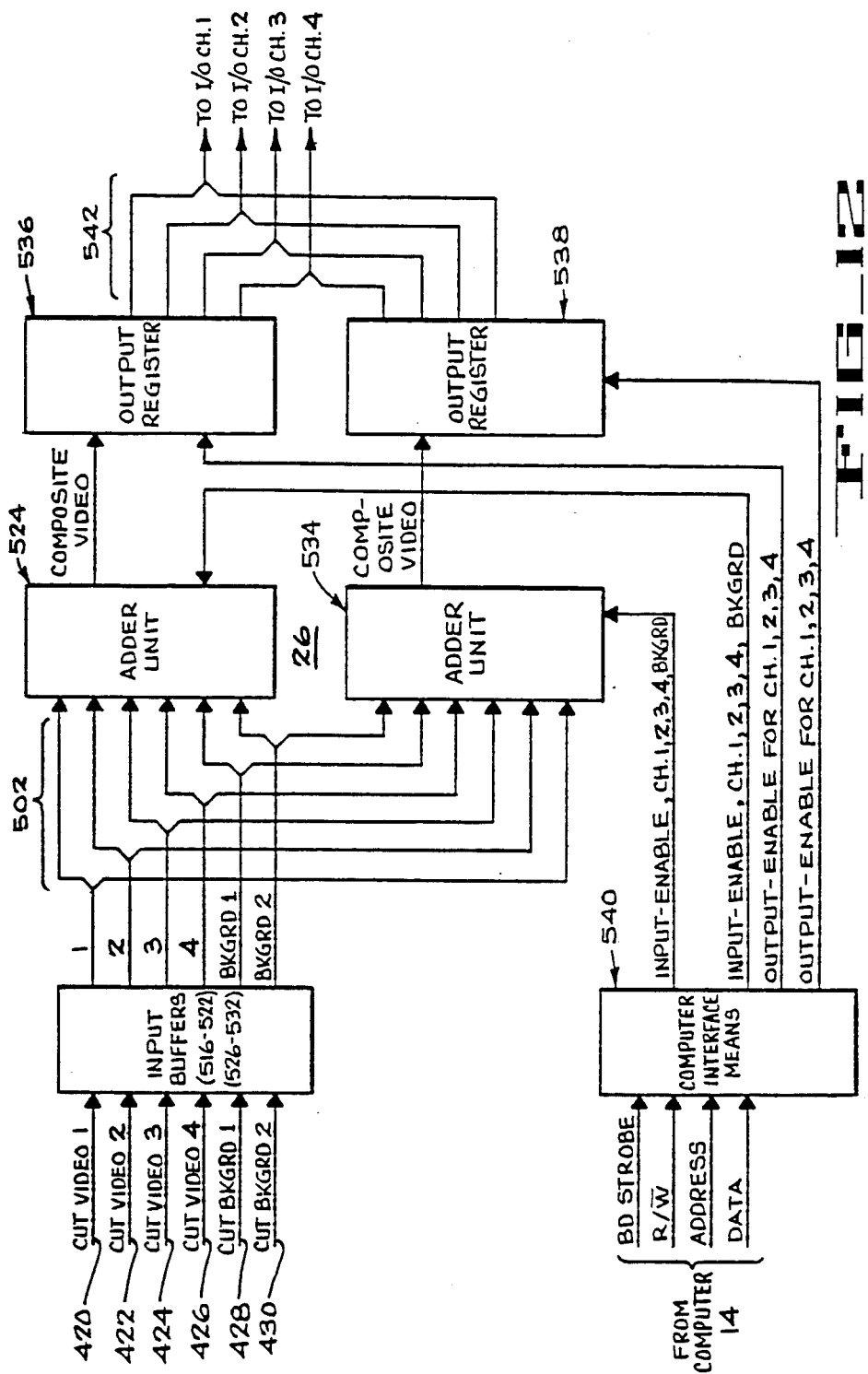

METHOD AND APPARATUS FOR COMBINING MULTIPLE VIDEO IMAGES IN THREE DIMENSIONS

BACKGROUND

This invention relates to the generation of special video effects and particularly to combining selected portions of multiple video images in three dimensions as determined by respective key signals.

Various systems and techniques exist for transforming, combining and/or otherwise manipulating video images, particularly for television. Such systems include three-dimensional image transforming, processors, combiners, and computer graphics image synthesizers that execute hidden surface algorithms.

There are digital optics special effects systems in the television field which modify and manipulate video images at real time video rates. One such system provides transformations of video images, including perspective, at real time video rates. Such system is manufactured by Ampex Corporation, Redwood City, Calif., under the name ADO digital special effects system, and is described in the Ampex Digital Optics Service Manual No. 1809550, issued November, 1983. This transformation system and its manner of operation are also generally described in Bennett et al. U.S. Pat. No. 4,472,732. Effects such as changes in picture size and position are also produced by the system transformations.

A digital combiner for combining images as transformed in this manner is also known, being also manufactured by Ampex Corporation. It is known as an ADO Concentrator combiner, Part No. 1464600, and is described in a service manual catalog No. 1809632-01, issued by Ampex Corporation in April 1984. Such combiner contemplates manipulation of multiple video images utilizing a video effect or technique known as a video channel combine. A "combine" is effected by combining two or more channels of video signals in such a way as to combine scenes or images corresponding to the various signals. For example, a combine may display a first video image from one channel in front of a second video image from a second channel, which in turn is in front of a third video image from a third channel, etc. The combine may appear over a selected background, such as black or gray or a selected color.

Such combiner provides the video images of the various channels in the combine with selected degrees of transparency. This allows images with lower priorities, that is, images which would be hidden behind another image, to show through; i.e., to be partially visible due to the transparency of the image or images in front. In a further effect, the images of any channel also can be dimmed, if desired, to the background. The dimming effect is enhanced by a light source feature which highlights selected images or planes while dimming others. The determination of the transparency and dimness of the channels, like the changes in priority of the channels, can be programmed to occur automatically, and is made on a video field-by-field basis. In addition, soft edge keying with a minimum of aliasing is accommodated, if a soft key is introduced by the signal system. The processes of designating priority, transparency and dimness are readily achieved by the combiner, because the system processes the key signals rather than the video images themselves.

The combiner, when employing at least four channels, can produce two independent combines simultaneously, with each combine being the result of combining two video images from two channels. Any one of the four channels may be selected for combination with any other channel to provide a combine. Each combine process is controlled by one of two different user operated control panels, with each combine utilizing different pairs of video images of the four video channels.

Video channel combines are produced in the combiner by digitally processing binary data samples corresponding to picture elements of an image. The signals in respective channels to be combined are synchronized by appropriate clock and timing signals so that data samples corresponding to the same discrete location on the viewing screen arrive at processing stations in the combiner during the same cycle of processing clock signals. The data samples are combined to produce composite data samples which correspond to a combined or composite video image to be displayed at the same temporal and spatial location on the viewing screen. Data samples are combined in the course of processing by taking a preselected portion of the value of each sample and adding the respective portions.

In the combiner, two or more channels of digital video data samples are supplied directly to a cutter by a signal system. The cutter performs the process of reducing (i.e., "cutting") the magnitude of the binary data samples to some portion of their original value. Each respective channel also supplies associated boundary key data to respective keyer means which, in turn, supply respective processed key signals indicative of the portion that the data samples of each respective channel are to be cut. The processed key signals are coupled to the cutter. The multiple channels of cut video signals are fed from the cutter to an adder. The adder sums the cut video signals to produce one or more composite video signals corresponding to respective composite video images. The composite video signals are fed back to the signal system for conversion to a conventional analog composite video signal. The signal system may comprise a number of the aforesaid ADO systems.

Although such combiner combines signals that have undergone three-dimensional transformation, it does not combine in three dimensions. Rather priority is assigned for an entire video signal, irrespective of the apparent depth perspective.

Three-dimensional effects are known in computer graphics. See, for example, Foley, J. D., and S. Van Dam, "Fundamentals of Interactive Computer Graphics," Addison-Wesley, 1982, and Newman, W. M. and R. F. Sproull, "Principles of Interactive Computer Graphics," Second Edition, McGraw-Hill, 1979. The latter, in Chapter 24, particularly at pages 369 to 370 and 372 to 373, describes a depth-buffer algorithm and scan-line coherence algorithms for hidden-surface elimination. The objects to be displayed are formed of respective polygons. All opaque surfaces are kept track of in three dimensions. The dimensions are in a screen coordinate system. For each polygon within a standard view box, the depth (in screen coordinates, not true depth) corresponding to each pixel on the viewing screen is compared with the depth previously stored for that pixel in a depth buffer, and if it is less than the stored depth, the stored depth is changed to the depth for that polygon and the picture intensity signal for that polygon at that pixel is substituted for the picture intensity signal previously stored. This is repeated for all polygons. This may be done a line at a time.

SUMMARY OF THE INVENTION

The present invention utilizes much of the circuitry of the combiners as described above. Indeed, the preferred embodiment of the invention was designed to incorporate the circuitry of the ADO Concentrator combiner and be used to add new functions to the prior system. This involved adding certain circuitry to permit three-dimensional combining. In general, the added circuitry may be considered a three-dimensional keyer. The present invention utilizes depth information defining respective image planes to modify the key signals of the combines. Although utilizing certain of the geometrical principles as set forth in the Newman et al. text, the present invention does not require conversion of depth coordinates to a screen coordinate system, rather it retains true depth data, permitting natural blending of images near plane intersections, avoiding aliasing. Utilizing key signals also makes it unnecessary to transfer data to a buffer one plane at a time, as with Newman et al., making it possible to operate in real time.

The present invention combines input video signals from each of a plurality of channels. One of the channels is preferably background. These signals are each in a form as output from a channel of an ADO transformation system and, hence, each includes data samples in raster scan order (two-field interlaced) that correspond to respective discrete locations on a viewing plane corresponding to a video screen. These locations are arranged in an array in accordance with a two dimensional coordinate system, generally considered as X to the right and Y down. Such data samples from the transforming system correspond to picture elements of an image lying in an image plane which may be displaced from the viewing plane and projected, as by perspective projection, upon the viewing plane. The video signal has associated therewith key signals corresponding to respective locations to which the image is projected. Each transforming system also supplies a set of signals that, each field, define the image plane in a three-dimensional coordinate system including a depth coordinate relative to a depth reference. Such set of signals may be a modified form of those utilized in developing the matrices used in the corresponding transformation. That is, they may be modified from the plane defining signals as previously used in the ADO systems.

From each set of signals defining a respective plane, a sequence of depth signals is produced corresponding to the depth coordinates of the respective image plane at each of the locations corresponding, by the respective perspective projection, to a respective sequence of the discrete locations, preferably in raster scan sequence. The depth signals of respective sets are then compared for each of the discrete locations and respective weighting signals are produced that are indicative of the relative depth of respective planes at the location in the planes corresponding to the discrete location, also in the same sequence.

The weighting signals are then combined with respective input key signals in respect to each input video signal to produce processed key signals corresponding to the respective discrete locations in the same sequence. Each set of processed key signals indicates the weighted portion of the respective data samples (luminance and chrominance) that are to be included in the combined video signal. The processed key signals are then used, as in the ADO concentrator combiner, to cut the respective data samples for each channel. Then all cut samples are combined to produce a combined video output signal.

A further feature of the present invention involves the blending of signals in regions of the viewing planes where the respective image planes are within a predetermined range of one another, an anti-aliasing feature. Transparency and dimming of respective images are also provided.

Thus a primary aspect of the present invention is to combine a plurality of video signals from respective video channels in a three-dimensional combine utilizing key signals to provide respective video signal components of proper amplitude for the combine. A further aspect is such combining wherein signals are blended in respect to respective image planes within a predetermined range of one another. These and other aspects, objects and advantages of the invention will be further apparent from the following detailed description, particularly when taken in conjunction with the accompanying drawings.

BRIEF DESCRIPTION OF THE DRAWINGS

FIGS. 1A and 1B together are a block diagram illustrating a three-dimensional combiner in accordance with the present invention as used in an overall systems environment;

FIG. 2 is a view of keys as shown on a viewer plane illustrating the interrelation of keys and image planes as used in the present invention;

FIG. 3 is a diagrammatic illustration of video and key signal formatting as used in the present invention;

FIG. 4 is a diagrammatic illustration of the geometric principles of a transformation system with which the present invention may be used;

FIGS. 5A and 5B together are a diagrammatic illustration of a three-dimensional keyer in accordance with the present invention;

FIG. 6 is a diagrammatic illustration of one of the depth circuits used in the keyer shown in FIG. 5;

FIG. 7 is a graphic illustration of the weighting function of the weighting circuits used in the keyer shown in FIG. 5;

FIG. 8 is a diagrammatic illustration, partly in block form, of the output keying circuit of the system shown in FIG. 1A;

FIG. 9 is a diagrammatic illustration of the cutter and adder circuits of the system shown in FIG. 1B;

FIG. 10 is a block diagram illustrating the cutter key portion of the cutter circuits shown in FIG. 9;

FIGS. 11A and 11B are diagrammatic illustrations of the cutter key assignments of the cutter keys developed by the circuit shown in FIG. 10;

FIG. 12 is a block diagram of the adder shown in FIG. 1B, showing the coupling to the input/output circuits.

DESCRIPTION OF PREFERRED EMBODIMENTS

A preferred embodiment of a three-dimensional combine according to the present invention is illustrated generally in FIGS. 1A and 1B as a multichannel system for combining four channels of input-video signals as supplied by an associated signal system including four transformation systems, particularly the aforementioned ADO transformation systems. The input video signals include data samples corresponding to transformed images and have associated input key signals, which may be soft boundary key signals. The boundary key signals indicate the portion of the video signals that correspond to image information and are soft in the sense that they have intermediate values at the edge of the image data to permit anti-aliasing control. A three-dimensional keying system according to the present invention develops three-dimensional keys indicating the priority of images to be presented on a viewing plane. These keys are further processed to produce processed key signals utilized in cutting the respective video signals. The cut video signals are then added and further processed to provide output video signals.

As shown in FIG. 1A, video signals with their associated key signals VIDEO & KEY-1, VIDEO & KEY-2, VIDEO & KEY-3, VIDEO & KEY-4, are generated by respective signal transformation systems 10, ADO-1, ADO-2, ADO-3, and ADO-4. Each system 10 develops a respective signature line reference signal LINE REF-1, LINE REF-2, LINE REF-3 and LINE REF-4. The systems 10 are controlled by control panels 12 which also generate CONTROL DATA providing the data and control signals to a computer 14 for operating the combiner. The systems 10 in turn generate respective sets of three-dimensional keyer control signals which are also applied to the computer 14. The video signals and line reference signals from the systems 10 are applied to respective input/output circuits 16, I/O-1, I/O-2, I/O-3, and I/O-4. The line reference signals are used for synchronizing the respective channels. They are applied to a clock-timing circuit 18 which develops appropriate clock pulses and timing signals for use as needed through the entire three-dimensional combiner. Appropriate timing signals are returned to the I/O circuits 16, where they are used to time respective delay means, such as buffers, to place all of the respective video signals in synchronism.

The transformation systems 10 of the ADO design provide video data samples corresponding to picture elements of an image in a digital format known as 4:1:1; that is four bytes of luminance data Y for one byte of chrominance of one kind (R-Y) and one byte of chrominance of another kind (B-Y). These are in accordance with conventional designations. These signals are presented in a format of 8 bits per byte with two bytes in parallel at a clock rate of about 75 nsec. Luminance bytes Y are presented each clock pulse over the part of the video signal corresponding to a viewing screen and correspond to luminance data in respect to respective discrete locations on the viewing screen. The locations are arranged in orthogonal rows of a two-dimensional coordinate system, specifically horizontal and vertical, wherein the horizontal coordinate is conventionally designated X increasing from left to right and the vertical coordinate is conventionally designated Y increasing from top to bottom, beginning at the upper left corner as viewed on the screen. Chrominance bytes are presented every other clock cycle, alternating between R-Y and B-Y. Between chrominance bytes are associated key bytes indicating the boundary of active video; that is, the key signal indicates when the signal is other than background for the particular image.

The key signals thus correspond to the outline of the image as projected from the image plane onto the viewing plane (corresponding to a video screen). For signals from the ADO transformation systems, these will normally be the outline of the original raster scans or frames as transformed to another plane (the image plane) and then projected by perspective projection upon the viewing plane. The original raster scan or frame is rectangular and as transformed and projected a quadrilateral. However, it is also possible to provide keys corresponding to foreground images in front of a background. In FIG. 2 are illustrated examples of keys for three input video signals, including a background or matte signal. A background key $K_m$ fills the entire viewing area and has a value of 1 over the entire frame for each discrete location of the two-dimensional coordinate system in the viewing plane. The other keys $K_1$ and $K_2$ represent the outlines of transformed and projected signals from respective ADO transforming systems. FIG. 2 is drawn to indicate the relative positions of the keys in their respective image planes, showing the image planes intersecting and indicating the relative depth position for the respective keys. That is, the plane corresponding to key $K_2$ penetrates the background plane corresponding to key $K_m$ along a line projected as $K_m \times K_2$, and the plane corresponding to key $K_1$ along a projected as $K_2 \times K_1$. Dashed lines show hidden edges of respective keys.

FIG. 3 at lines A and B illustrates the format of bytes of luminance, chrominance and key signals as received at an I/O circuit 16 from an ADO transformation system 10. The I/O circuits reformat the signals into the format shown at lines C and D. This may be done in any convenient manner and is performed by the I/O circuits of the ADO Concentrator combiner mentioned above. These provide respective key signals $K_1$, $K_2$, $K_3$, and $K_4$, in the format shown in line D for use by a three-dimensional keyer 20. They also provide respective luminance and chrominance signals in the format shown at line C as input video signals for the combiner, INPUT VIDEO-1, INPUT VIDEO-2, INPUT VIDEO-3 and INPUT VIDEO-4. The three-dimensional keyer 20 operation responds to the input key signals $K_1$, $K_2$, $K_3$, and $K_4$, and sets of signals defining the respective image planes as provided by the respective systems 10 to produce weighted key signals $K_1''''$, $K_2''''$, $K_3''''$, and $K_4''''$. The weighted key signals allow for transparency of respective image planes and their respective depths corresponding to each discrete location on the viewing plane. The weighted signals are applied to an output keying circuit 22, which may be that used in the ADO Concentrator combiner.

The output keying circuit 22 converts the keys into respective processed keys $K_{P1}$, $K_{P2}$, $K_{P3}$, and $K_{P4}$, and provides processed background keys $K_{Pm1}$ and $K_{Pm2}$ and composite keys $K_{PC1}$ and $K_{PC2}$, and background video signals BKGD VIDEO-1 and BKGD VIDEO-2. The processed keys include any dimming effects and are applied to a cutter circuit 24 where they are used to cut the respective input signals to produce respective CUT VIDEO and CUT BKGD signals. The CUT VIDEO and CUT BKGD signals are added in an adder 26 to provide a COMPOSITE VIDEO signal which is applied to an input/output circuit 28 with an appropriate composite key $K_{PC1}$ or $K_{PC2}$. The I/O circuit 28 reformats the COMPOSITE VIDEO signal into the format of FIG. 2, lines A and B, that is, to the format of the signal outputs of the systems 10.

The operation of the three-dimensional keyer 20 depends upon geometrical considerations and particularly upon those of the transformation systems 10. For ADO transformation systems, the geometry is as illustrated in FIG. 4. In FIG. 4 a line 30 represents an edge view of the viewing plane, corresponding to the viewing screen.

It has two dimensions with two coordinates (X,Y) representing location in respective orthogonal directions. A line 32 is orthogonal to the viewing plane 30 from the center of the viewing screen. EP designates an eye point lying along the line 32 at a distance 1/P from the viewing plane 30, P designating perspective. The eye point is the location of the eye that a particular perspective projection is based upon. A depth coordinate z is the distance along the line 32 away from the eye point EP, with the viewing plane 30 lying at z=0.

In an ADO transformation system, data samples corresponding to a source image at the viewing plane are effectively transformed by linear transformation to corresponding points on an image plane 34 and then projected by perspective projection, that is, toward the eye point EP, onto the viewing plane. A source data sample corresponding to a discrete location $P_s(x_s,y_s,0)$ in the viewing plane is transformed to a point $P_i(x_i,y_i,z_i)$ in the image plane 34 and then projected by perspective projection to a corresponding discrete location $P_t(X,Y,0)$ as a target location on the viewing plane. Because there is not a 1-to-1 correspondence between discrete source locations $P_s$ and discrete target locations $P_t$, filtering and interpolation are provided by the transformation system 10, but the geometrical considerations remain the same. The video signals from the systems 10 represent data samples (digital luminance and chrominance) corresponding to respective discrete locations on the viewing plane taken in a predetermined sequence, namely, raster scan sequence. The coordinate system is conventionally taken as having its X,Y coordinates begin at (1,1) at the upper left of the viewing screen as viewed from the eye point, with X progressing rightward and Y downward. The data samples of the video signal are thus related to locations defined by X and Y according to the sequence. Each depth coordinate is determined geometrically from the set of signals defining the respective image plane 34.

Simple geometry requires:

$$x_i = X(Pz_i+1) \quad (1)$$

$$y_i = Y(Pz_i+1) \quad (2)$$

The well known equation for a plane in such coordinate system is:

$$ax+by+cz+d=0 \quad (3)$$

where a, b, c and d are constants defining the plane. For the image plane 34, the corresponding equation may be stated:

$$a_ix_i+b_iy_i+c_iz_i+d_i=0 \quad (4)$$

This may be solved for $z_i$:

$$z_i = -(aX+bY+d)/(PaX+PbY+c) \quad (5)$$

This may be converted to the depth measured from the eye point EP by adding 1/P to each side of Equation (5) and simplifying the fraction:

$$z_i+1/P = (c/P-d)/(PaX+PbY+d) \quad (6)$$

This provides a simple test for the condition where the point $P_i$ is behind the eye point; that is, when, $z_i+1/P$ is negative.

Another useful factor to introduce is a range factor R. Then:

$$R(z_i+1/P) = R(c/P-d)/(PaX+PbY+d) \quad (7)$$

The range factor R permits control of range in blending between keys as an anti-aliasing measure. For simplification, this converts to $$R(z_i+1/P) = 1/(AX+BY+C) \quad (8)$$

where $A = Pa/R(c/P-d)$, $B = Pb/R(c/P-d)$ and $C = d/R(c/P-d)$.

Each field the control panels 12 for the ADO transformation systems 10 provide a set of constants defining respective image planes in order to perform their respective transformations. They also require a perspective number P for the transformations. That is, the set of constants and the perspective number are used to provide the transforms in making the respective perspective transformations. Whatever the forms of such sets of constants, they may be used with the constant P and a selected range constant R to compute the constants A, B and C each field for each image plane. Although there may be occasions for using different perspective numbers for the different image planes, preferably all planes are viewed from the same eye point, and the invention will be described with a single perspective number P, which may be changed in the control panels 12, as desired for a particular effect.

These constants may be computed in the systems 10 by conventional arithmetic processes. Means for performing such processes are added to the ADO systems to present respective sets of three-dimensional keyer control signals to the computer 14, whence, they are applied on the computer output bus each field at proper times. These respective sets of signals define the respective image planes. These sets of signals $A_1$, $B_1$, $C_1$, $A_2$, $B_2$, $C_2$, $A_3$, $B_3$, $C_3$, $A_4$, $B_4$, $C_4$, are applied to respective depth circuits 36 of the three-dimensional keyer 20 as shown in FIG. 5. In response to such sets of signals and appropriate timing and clock pulses, the depth circuits 36 generate a series of depth signals for each image plane in the predetermined sequence corresponding to the raster scan sequence of corresponding discrete locations on the viewing plane. Each depth circuit 30 may be as shown in FIG. 6.

As shown in FIG. 6, the set of signals corresponding to the constants A, B and C for a respective field are latched into respective registers 38A, 38B and 38C at the appropriate time prior to each field. The constants are available throughout the generation of the depth signals and are applied to a summing circuit 40. The arithmetic operation to be performed is conventional and is shown conventionally. That is, the constant C is introduced into the summing circuit 40 and thence into registers 42 and 44. Next the signal B is added to C (from the register 42) in the summing circuit 40, and the sum is put in the registers 42 and 44. The signal A is then added to the sum (B+C) in the summing circuit 40, and that sum is stored in the register 42. The sum in the register 42 is then added again to A in the summing circuit 40, and so on for each X-coordinate across the viewing plane, generating the function (AX+B+C). Then B is added in a similar fashion to the signal (B+C) in the register 44, and A is repetitively added as before to generate the signal (AX+2B+C) for each X-coordinate of the second line across the viewing plane. This continues for each Y-coordinate down the viewing plane until a signal has been generated corresponding to the depth of the respective image plane corresponding to the perspective projection of each discrete location (X,Y) on the viewing plane, generating (AX+BY+C).

(The foregoing description of the depth circuits 30 is slightly over-simplified for the sake of explanation. Such description is accurate for data samples in a deinterlaced frame of video data samples. As the data samples are in practice presented in a two-field interlaced format, the computation proceeds slightly differently, but on the same principle. For two-field computation, the computation proceeds as though Y were 2Y for one field and (2Y+1) for the other field.)

These signals may be in the form of 32-bit fixed point numbers appearing at the output of the summing circuit 40 in the raster scan sequence. These signals are converted in a fixed-to-float converter 46 to a logarithmic signal having a 24-bit mantissa and 5-bit exponent. A signal corresponding to the reciprocal of this signal is then calculated by a dividing circuit 48 and then reconverted to a 24-bit fixed point signal by a float-to-fixed converter 50. This provides the depth signals $R(z+1/P)$ for each respective image plane in raster scan order.

A comparable depth signal $R(z_m+1/P)$ is applied on the computer bus to define the background plane at depth $z_m$. The background plane is parallel to the viewing plane and, hence, no depth determination need be made corresponding to respective discrete locations on the viewing plane. The depth is the same in respect to all locations of background.

The respective depth signals are all applied in synchronism in the same raster scan order to difference circuits 52. There are two difference circuits for each combination of two depth signals. For each pair, one is subtracted from the other in one difference circuit and the other from the one in another. Thus, there is developed a difference signal indicative of how far one plane is in front of another for all combinations of planes in respect to each respective discrete location on the viewing plane, taken in raster scan order.

For example, the signal $R(z_2+1/P)$ is subtracted from the signal $R(z_1+1/P)$:

$$R(z_1+1/P)-R(z_2+1/P)=R(z_1-z_2) \qquad (9)$$

A negative difference indicates that image plane 1 is in front of image plane 2. The difference signals are applied to respective weighting circuits 54 which produce weighting signals systematically related to the applied difference signals in accordance with a weighting function w as shown in FIG. 7.

FIG. 7 shows the weighting function w as a function of the difference between depth signals. The function is linear between limits of $-1$ and $+1$, being 0 when the difference is below $-1$ and 1 when the difference is above $+1$, and varying linearly therebetween. The weighting signal is $\frac{1}{2}$ when the difference is 0. As an example, if the difference $R(z_1-z_2)$ is $-\frac{1}{4}$, meaning the image plane 1 is in front of the image plane 2 by a depth $\frac{1}{4}R$, the 1 corresponding weighting function $w_{12}$ is $\frac{1}{4}$. At the same time, the weighting function $w_{21}$ is $\frac{3}{4}$, corresponding to $R(z_2-z_1)=+\frac{1}{4}$. The respective weighting circuits 54 are identified on FIG. 5A by the differences they correspond to. The weighting signals w are applied to respective preliminary minimum circuits 56 along with respective modified key signals.

The input key signals $K_1$, $K_2$, $K_3$, and $K_4$, are applied to respective clipping circuits 58 which are controlled by respective depth signals. As stated above, the depth when measured from the eye point EP provides a simple test for the condition when the point $P_i$ is behind the eye point. When $Z_i+1/P$ is negative, the respective image plane at that point is behind the eye point. If R is positive, as it preferably is, the same is true in respect to $R(z_i+1/P)$. Hence, the sign of a respective depth signal as applied to a clipping circuit is determinative of whether or not the image plane is behind the eye point EP. The format of the depth signals is binary in which the most significant bit indicates sign (positive or negative). The most significant bit is used as an enabling signal in the respective clipping circuits 58, cutting off the respective key signal when the sign of the depth signal is negative and passing it full size when the sign is positive. This produces respective clipped key signals $K_1'$, $K_2'$, $K_3'$, and $K_4'$, which are the same as the respective key signals $K_1$, $K_2$, $K_3$, and $K_4$ when the respective sign is positive and 0 when the respective sign is negative.

The clipped signals $K_1'$, $K_2'$, $K_3'$, and $K_4'$ are applied to respective multiplying circuits 60. The multiplying circuits multiply the respective input signals by respective constants as determined by respective control signals $CTL_1$, $CTL_2$, $CTL_3$, and $CTL_4$ supplied on the computer bus. These control signals determine apparent transparency of the images in the respective image planes. For example, a control signal of $\frac{1}{2}$ reduces the input key signal to $\frac{1}{2}$ its original magnitude and ultimately reduces the corresponding cut video signal. For example, if $K_1'$ is 1 and $CTL_1$ is $\frac{1}{2}$, the output of the respective multiplying circuit 60 is a key signal $K_1''$ that is $\frac{1}{2}$. Similarly, key signals $K_2''$, $K_3''$, and $K_4''$, are produced at the outputs of other respective multiplying circuits 60. In addition, a background or matte key signal $K_m$ is applied to the three-dimensional keyer 20, either from the computer bus or from a constant source within the keyer 20. It is a key signal of magnitude 1 at all times, to assure that when all other key signals are 0, there is a default to the background key to provide a total of 1. This signal is not clipped, as background cannot be behind the eye point EP. Neither is the background ever transparent, as that is the default plane. Hence, the signal $K_m=K_m'=K_m''=1$.

The clipped key signals as modified for transparency, that is, $K_1''$, $K_2''$, $K_3''$, $K_4''$, and $K_m''$ are applied to respective preliminary minimum circuits 56 corresponding to respective weighting signals w from the weighting circuits 54. That is, the key signal $K_1''$, is applied to minimum circuits 56 $MIN_{21}$, $MIN_{31}$, $MIN_{41}$, and $MIN_{m1}$ with the respective weighting signals $w_{21}$, $w_{31}$, $w_{41}$, and $w_{m1}$. The key signals $K_2''$, $K_3''$, $K_4''$, and $K_m''$ are similarly applied. The respective preliminary minimum circuits 56 compare the respective inputs and output signals corresponding to the lesser of the respective two. Signals indicative of the complements of these signals are developed by respective inverters 62. The inverters 62 perform the function of subtracting the input from a fixed level to perform the binary subtraction $$1-\text{signal}=\text{signal complement} \qquad (10)$$

The complementary signals are applied to respective final minimum circuits 64, to which respective key signals $K_1''$ to $K_m''$ are applied. For example, the complementary signals of preliminary minimum circuits 56 $MIN_{12}$, $MIN_{13}$, $MIN_{14}$, and $MIN_{1m}$, are applied to a final minimum circuit $MIN_1$ along with the key signal $K_1''$. The final minimum circuits 64 compare respective input and output signals corresponding to the lesser of the respective two, producing respective signals $K_1'''$, $K_2'''$, $K_3''' 40$, $K_4'''$, and $K_m'''40$.

An example may best serve to explain the operation of the three-dimensional keyer 20. Let the conditions in respect to a particular discrete location on the viewing plane be as follows:

1. Image plane 1 is far closer to EP than image planes 2, 3 and background; hence, $w_{12}=0$, $w_{21}=1$, $w_{13}=0$, $w_{31}=1$, $w_{1m}=0$, $w_{m1}=1$.
2. $K_1$ is 1, and image plane 1 is in front of EP and 50% transparent; hence, $K_1''=\frac{1}{2}$.
3. Image plane 2 lies toward EP from image plane 3 by an amount corresponding to $R(z_2-z_3)=-\frac{1}{4}$ and is far from the background plane; hence, $w_{32}=\frac{3}{4}$, $w_{23}=\frac{1}{4}$, $w_{2m}=0$, $w_{m2}=1$.
4. $K_2$ is 1, and image plane 2 is in front of EP and opaque; hence, $K_2''=1$.
5. Image plane 3 lies toward EP far from the background plane; hence, $w_{3m}=0$, $w_{m3}=1$.
6. $K_3$ is 1, and the image plane 3 is in front of EP and opaque; hence, $K_3''=1$.
7. Image plane 4 lies far behind EP; hence, $w_{41}=w_{42}=w_{43}=w_{4m}=0$, $w_{14}=w_{24}=w_{34}=w_{m4}=1$, and $K_4''=0$.
8. $K_m''=1$.

As a consequence of these conditions, the respective minimum circuits 56 and 64 determine the respective keys $K_1'''$ to $K_m'''$.

For $K_1'''$, with $w_{12}=0$, $w_{13}=0$, $w_{1m}=0$ and $K_4=0$, the outputs of preliminary minimum circuits 56 $MIN_{12}$, $MIN_{13}$, $MIN_{14}$, and $MIN_{1m}$, are all 0 and their complements applied to the final minimum circuit 56 $MIN_1$ are all 1. Circuit $MIN_1$ thus selects $\frac{1}{2}$, the value of $K_1''$ as the output $K_1'''$.

For $K_2'''$, with $w_{21}=1$ and $K_1''=\frac{1}{2}$, the output of preliminary minimum circuit 56 $MIN_{21}$ is $\frac{1}{2}$, as is its complement. With $w_{23}=\frac{1}{4}$ and $K_3''=1$, the output of preliminary minimum circuit 56 $MIN_{23}$ is $\frac{1}{4}$, and its complement is $\frac{3}{4}$. With $w_{2m}$ and $K_4''$ both equal to 0, the outputs of preliminary minimum circuits 56 $MIN_{24}$ and $MIN_{2m}$ are 0, and their complements 1. With $K_2''=1$, the final minimum circuit 64 $MIN_2$ selects $\frac{1}{2}$ for $K_2'''$.

For $K_3'''$, with $w_{31}=1$, and $K_1''=\frac{1}{2}$, the output of preliminary minimum circuit 56 $MIN_{31}$ is $\frac{1}{2}$, and its complement $\frac{1}{2}$. With $w_{32}=\frac{3}{4}$ and $K_2''=1$, the output of preliminary minimum circuit 56 $MIN_{32}$ is $\frac{3}{4}$, and its complement $\frac{1}{4}$. With $K_4''=0$ and $w_{3m}=0$, the output of preliminary circuits 56 $MIN_{24}$ and $M_{2m}$ are 0, and their complements 1. With $K_3''=1$, the final minimum circuit $MIN_3$ selects $\frac{1}{4}$ for $K_3'''$.

For $K_4'''=0$, the final minimum circuit $MIN_4$ selects 0 for $K_4'''$.

For $K_m'''$, with $w_{m2}$, $w_{m3}$, $K_2''$ and $K_3''$ all 1, the outputs of the preliminary minimum circuits $MIN_{m2}$ and $MIN_{m3}$ are 1 and their complements 0, so that the final minimum circuit $MIN_m$ selects 0 for $K_m'''$.

In this example $K_1'''=\frac{1}{2}$, $K_2'''=\frac{1}{2}$, $K_3'''=\frac{1}{4}$, $K_4'''=0$ and $K_m'''=0$. This would result in a composite key of more than 1. As it is important that the composite key not exceed 1, the signals are normalized by a normalizing circuit 66 comprised of a summing circuit 68, a dividing circuit 70 and respective multiplying circuits 72. The summing circuit adds the signals $K_1'''$, $K_2'''$, $K_3'''$, $K_4'''$ and $K_m'''$. A signal corresponding to the reciprocal of the sum signal is calculated by the dividing circuit 70. The signal representing the reciprocal of the sum is applied to each of the multiplying circuits to which respective signals $K_1'''$, $K_2'''$, $K_3'''$, and $K_4'''$, are applied, hence, producing normalized signals $K_1''''$, $K_2''''$, $K_3''''$, and $K_4''''$. A signal $K_m''''$ is not produced, for it would simply correspond to the remainder after subtracting $K_1''''$, $K_2''''$, $K_3''''$, and $K_4''''$ from 1.

In the above example, because $K_1'''=\frac{1}{2}$, $K_2'''=\frac{1}{2}$, $K_3'''=\frac{1}{4}$, $K_4'''=0$ and $K_m'''=0$, their sum taken by summing circuit 68 is 5/4, the reciprocal of which taken by the dividing circuit 70 is 4/5. The outputs of the multiplying circuits 72 are, therefore, $K_1''''=2/5$, $K_2''''=2/5$, $K_3''''=1/5$, $K_4''''=0$ and $K_m''''=0$.

The normalized signals from the three-dimensional keyer 20 are applied to the output keying circuit 22. As mentioned above, the preferred embodiment of the three-dimensional keyer 20 was designed to operate with an existing ADO Concentrator combiner so that the functions of both are available in a single unit. In fact, the three-dimensional combiner of the present invention utilizes the keying circuit 22 of the ADO Concentrator combiner to develop the processed keys. The cutter 24, adder 26 and I/O circuits 28 also utilize the circuits of the ADO Concentrator combiner. This results in a three-dimensional combiner that includes a number of components unnecessary for the three-dimensional combiner, but which are present for other effects. The combiner circuits are described as actually built and used. This will include a description of the two-dimensional ADO Concentrator combiner circuitry with a description of how the three-dimensional combiner utilizes it.

FIG. 8 shows the output keying circuit 22 as present in the pre-existing ADO Concentrator combiner, to which the key signals $K_1''''$, $K_2''''$, $K_3''''$, and $K_4''''$ are applied. For simplicity of description, because the components for the respective channels 1–4 of the output keying circuit 22 are identical, only the channel 1 circuit is discussed in detail. Thus, a keyer unit 204 is described in detail, while keyer units 206, 208, 210 of channels 2, 3 and 4, respectively, are shown in block form.

Referring to channel 1 of FIG. 8, the key $K_1''''$ comprises the values of the binary numbers which define the display on the viewing screen of a video image projected from an image plane 1 and displayed on a given background. The key at this point is in the form of binary numbers of 8 bits. The values of the key range over values between 0.0 and 1.0. Normally the key will be 1 over the area of the projected image and 0 over the background, with graduated intermediate values at the margin of the image to provide soft keying for the purpose of anti-aliasing. The image will normally be a quadrilateral as shown in FIG. 2 for transformed and projected images as produced by an ADO system 10.

The key $K_1''''$ is supplied to a transparency multiplier 212, which controls the transparency of the channel by modifying the key data directly in response to a computer control signal on a control line 214. The control signal is in the form of a transparency factor, or coefficient, supplied on the computer bus from the computer 14, which directs the multiplier 212 to multiply the received key $K_1''''$ data by the coefficient to provide a key which is reduced according to the magnitude of the coefficient. For example, if the coefficient equals 1, there is no effect on the key $K_1''''$. If the coefficient is some value less than 1, the multiplier 212 reduces the value of the key accordingly. The coefficient key reduction for transparency effects may be changed on a fieldby-field basis. When the three-dimensional keyer 20 is being used, the coefficient is set at 1 because the desired transparency has already been introduced by the comparable multiplier 60.

The key $K_4''''$ (after transparency) is introduced to a programmable time delay 216, which corrects the timing of the key for subsequent introduction to the key processing logic, viz., into a priority processor 218. The extent of the delay is programmed by the computer 14 corresponding to a control input 220 of the variable delay 216. Although keys for all channels are synchronized prior to entering the keyer units, they must be retimed so that, depending upon the priority order of the channels, corresponding key data in different channels are processed by respective keyer units at the proper time. The priority order is controlled by the computer means 14 and, accordingly, the delay control signal will reflect the priority of the channels. A highest priority channel will receive the shortest delay; whereas, the lowest priority channel will receive the longest delay. It follows that time delay of the highest priority channel is zero, with increasing time delays programmed for the delays in the channels of decreasing priority order. As described further below, the overall time delays of all channels also must be identical. Accordingly, as the computer means 14 changes the priorities of the channels on a field-by-field basis, it also alters all the channel delays to reflect the change in the priorities. For reasons that will become apparent, when using the three-dimensional keyer 20, it makes no difference which channel has priority. The computer is arbitrarily programmed to select a particular priority, for example, 1, 2, 3, 4. The following description will assume this priority.

The key $K_1''''$ from delay 216 thus is essentially the same signal as the applied key $K_1''''$, except for any reduction which may have been made in channel transparency, which is not done when using the three-dimensional keyer 20. The key from the delay 216 is introduced on a bus 224 as a "key-requested" output to the priority processor 218 and particularly to a minimum circuit 222 thereof. The priority processor 218 also receives an input on a bus 226 from a dual selector 228. The selector has first and second halves, and each selects one of (N+1) inputs for output therefrom in response to a common control 229 for both halves, which extends to the computer bus of the computer 14. The key on bus 226 is labeled "key-taken-prior" and is the resource, or key value, which has been taken by any higher priority channel. The key-taken-prior is fed to an inverter 230 which performs a binary inversion and generates a key on a bus 232 herein labeled "key-available38 . The minimum circuit 222 provides an output which is the minimum value of the key-available and the key-requested outputs on buses 232, 224, respectively. The output on a bus 234 is labeled "key-taken" $K_{T1}$, and is, in essence, the undimmed processed key for channel 1.

The minimum circuit 222 is employed for two reasons: First, under the condition for a particular image, where the key has not been reduced and channel 1 would take a selected amount of the key resource, the resource can be taken since none was taken previously. That is, channel 1 can have all the resource it requests as long as the key available is equal to or greater than the value requested. Second, if the channel requests a given amount of the key resource, but the key available is zero, the channel can have only so much of the resource as is available, viz., none. The minimum circuit 222 performs a straightforward minimum value select, and includes a comparator, which compares the inputs to determine which is smaller, and a selector which then selects the smaller of the inputs.

Thus, the key-taken output on bus 234 is the undimmed channel 1 key, which is then fed to a dimness multiplier 236, similar in function to the transparency multiplier 212 previously discussed, except that the channel is dimmed; that is, a percentage of background video will be forced into the channel video. The dimness multiplier 236 is in the combiner system because, once the key-taken output on bus 234 is generated for the channel, there is no possibility of reducing the key value, since any reduction would reflect erroneously on lower priority channels which receive this output. However, there are instances in which it is desirable to reduce the value; i.e., dim the processed key of a channel. Accordingly, the dimness multiplier 236 allows the present combiner to alter the key-taken output to a smaller value, in response to a dimness factor or coefficient supplied at a control input 238 thereof, from the computer bus of the computer 14. As with the transparency multiplier 212, if a coefficient of 1 is provided by the computer 14 on control line 238, there is no reduction in the key-taken output. The full value is passed to a bus 240 as the processed key $K_{P1}$ for channel 1 after dimming. If a smaller coefficient is supplied by the computer, then a proportionate amount of reduction in the key-taken output is provided by the dimness multiplier 236, which is reflected in the value of the processed key $K_{P1}$ on bus 240.

The processed key $K_{P1}$ on bus 240 is fed to another programmable time delay 242 similar to the delay 216. The second delay 242 re-times the processed key $K_{P1}$ according to the delay required for the particular channel in order to supply the processed key at the subsequent cutter 24 to allow the processed key to be multiplied by the respective input video 1 signal in the cutter 24. It follows that all processed keys $K_{P1}$, $K_{P2}$, $K_{P3}$ and $K_{P4}$ must be timed with each other. Thus the time delay of the delay 242 is the complement of the amount of time provided by the delay 216. Further, the overall delay of each channel, that is, the amount of time delay between the input to the first delay (216) and the output of the second delay (242) through the key processing paths of each of the channels 1-4, must be identical. The time of delay is programmed via the control line 244 coupled to the computer bus of the computer 14. Thus, the processed key $K_{P1}$, properly timed by delay 242, is fed to the cutter 24.

Returning to the priority processor 218, the key-taken output on bus 234 and the key-taken-prior output on the bus 226 are supplied to an adder 246 which sums the resources and provides a "key-taken-now" output on a bus 248. The key-taken-now is the combination of the resource that was taken by any higher priority channels and that taken by channel 1. The key-taken-now output is coupled to a bus 250 of a pair of buses, which extend through the keyer units of all the channels 1-4, as well as through the background key units. The bus 250 is coupled back to the input of the first section of the dual selector 228 which, in turn, provides the key-taken-prior on bus 226. Likewise, the bus 250 also inputs to the first sections of the dual selectors of the other channel keyer units 206, 208 and 210. The bus 250 also is coupled to a first section of a dual selector 252 of a first background key channel, and to a first section of a dual selector 254 of a second background key channel.

A second bus 256 also extends through the keyer units, and is coupled to the second sections of the dual selectors 252, 254 of the first and second background key channels, as well as to the second sections of the dual selectors of the video channels 1-4, respectively. The separate buses 250, 256 may comprise a single, multiplexed bus, if desired.

It may be seen that the key-taken-now output on bus 248 and bus 250 indicates what is available for the next lower priority channel to select via the respective dual selector of that channel. For example, if channel 1 has the highest priority and channel 2 the next lower priority, the channel 2 dual selector 257 will select the key-taken-now from channel 1 as its input on a bus 258 and will feed it to its priority processor 259 under a computer command extending to control line 261. Thus the subsequent key-taken-prior output fed to next lower priority channel, 2 in this example, identifies the value of the key resource taken previously by the higher priority channel 1.

The second section of the channel 1 dual selector 228 is coupled to the bus 256 and operates simultaneously with the first section, to provide a key-taken-prior after dim output on a bus 260, coupled to one input of a dimness adder 262. The other input to the adder 262 is the processed key after dimming $K_{P1}$ on bus 240. Thus the adder 262 provides means for accounting for how much of the key resource was taken by channel 1 after the dimming process, if any dimming was performed. The adder 262 provides a key-taken-now output, after dimming, which includes the dimmed values of all prior channels, and which is coupled to the bus 256. Subsequent lower priority channels are coupled to the bus 256 in a succession determined by the priority, in response to the computer 14, whereupon the channel with lowest priority provides an output from its dimness adder, which is the sum of all channel dimming processes, that is $K_{P1}+K_{P2}+K_{P3}+K_{P4}$. Thus the final output provides an indication of how much background video is to be included in the composite video image where no video image is present, or due to the contribution of the dimming processes in regions where video images are present.

Accordingly, the two buses 250 and 256 carry key resource data which indicate, respectively, how much key resource has been taken by any higher priority channels, and how much key resource has been taken after dimming processes. The buses 250, 256 also are coupled to respective 8 bit buses 266 and 268, whereby each bus 250, 256 has one more set of 8 lines than there are number of channels in the system. A binary 0 is initially inserted on buses 250, 256 via the buses 266, 68, since the highest priority channel must have a 0 input for its key-taken-prior signal on bus 226 and for its key-taken-prior after dim on bus 260, because no amount of the key resource has been taken prior to the highest priority channel. Accordingly, the computer 14 provides the highest priority channel dual selector with an 0 on the buses 250, 256. Both the key-taken-prior bus 226 and the key-taken-prior after dim bus 260 thus are supplied with binary 0, which inputs are fed to the respective priority processor 218 and dimness adder 262.

As mentioned above, the lowest priority channel determines the final value of the dimness reduction and supplies the sum $K_{P1}+K_{P2}+K_{P3}+K_{P4}$ to the bus 256.

The computer then enables the dual selector 252 or 254 of the respective background key channel corresponding to the associated combine process. The key-taken-now after dim output indicative of the sum of the key resources after all dimming processes, $K_{P1}+K_{P2}+K_{P3}+K_{P4}$ is fed via the dual selector 252 or 254 to an inverter 270 or 272. The inverter provides an output $K_{Pm}$ which is the complement of the input, i.e., $1-K_{P1}-K_{P2}-K_{P3}-K_{P4}$. The resulting processed background key $K_{Pm1}$ or $K_{Pm2}$ from inverter 270 or 272 is fed to a programmable time delay 274 or 278, respectively, wherein the key $K_{Pm1}$ or $K_{Pm2}$ is suitably delayed to provide proper timing for the subsequent multiplication process in the cutter 24. As previously discussed relative to the processed key channel delays, the total time through the processed key channels and the background key channels must be identical. The suitably timed processed background keys $K_{Pm1}$ and $K_{Pm2}$ are provided to the cutter 24. The processed background keys provide data which determine how much background should be included in the composite image to compensate for dimming performed in the respective channels. Thus, if dimming in a channel is requested back to background level, as when it is desired to reduce luminance and chrominance to zero, the resulting hole in the composite video image of that channel will be filled with background.

Where there is no dimming performed in any of the channels, which may be generally the case, the output of the priority processor and of the dimming multiplier will be identical. Accordingly, the background key fills background in all areas of the video picture which are not occupied by the combined video images from the channels.

The second sections of the dual selectors 252, 254 of the respective background key channels, are used to provide the composite keys $K_{Pc1}$ and $K_{Pc2}$ to the I/O circuits 28. To this end, the outputs of the channel priority processors are supplied via the respective bus (248) and adder (246) of the lowest priority channel, to the bus 250 as a key-taken-now output, which data are indicative of how much key resource has been taken by all of the channels in a specific combine. The second section of the respective dual selectors 252 or 254 are enabled by the computer 14 to pass the key-taken-now output from the bus 250 to a respective programmable time delay of delays 276, 280, and then to the I/O circuits 28. It may be seen that the processed composite keys $K_{PC1}$ and $K_{PC2}$ differ from the complement of the processed background keys in that the former do not have any contribution due to the dimming process. Thus the composite key $K_{PC1}$ or $K_{PC2}$ is employed downstream of the present combiner as, for example, by a downstream switcher (not shown) in order to key in a different background than that provided by the combiner system.

Background video is depicted herein on FIG. 8, as supplied by background video generators 282, 284 on respective output buses 52, 56. The resulting background video 1 and 2 comprise generally conventional programmable color matte.

It should now be apparent from the above why order of priority in the output keying circuit 22 is unimportant and why most of the circuit is not really needed at all when using the three-dimensional keyer 20. It is present mostly for the sake of the functions performed when the three-dimensional keyer 20 is not used and so that the three-dimensional keyer 20 can be more easily added to existing combiners. More explicitly, the three-dimensional keyer 20 provides normalized outputs wherein the sum of $K_1''''$, $K_2''''$, $K_3''''$, and $K_4''''$ cannot exceed 1. A consequence of this is that the keyer units 204, 206, 208 and 210 always have enough key-available to satisfy key-requested, irrespective of the order of priority. Further, the processed background ke $K_{Pm1}$ or $K_{Pm2}$ is always available from the three-dimensional keyer 20 by normalizing the key signal $K_m'''$ or by taking the difference $1 - K_1'''' - K_2'''' - K_3'''' - K_4''''$. In respect to three-dimensional keying, the useful keying functions performed by the output keying circuit 22 are, therefore, only in respect to dimming. These could as well have been provided simply by adding respective dimming multipliers to dim the signals $K_1''''$, $K_2''''$, $K_3''''$, and $K_4''''$ to produce respective processed key signals $K_{P1}$, $K_{P2}$, $K_{P3}$, and $K_{P4}$. The processed composite key signal $K_{PC1}$ or $K_{PC2}$ could then be generated by simple addition, e.g., $K_{PC1} = K_{P1} + K_{P2} + K_{P3} + K_{P4}$. Only one processed composite key would be generated when using the three-dimensional keyer 20.

Referring to FIG. 9, the four processed keys $K_{P1}$, $K_{P2}$, $K_{P3}$ and $K_{P4}$ and the two processed background keys $K_{Pm1}$ and $K_{Pm2}$ are supplied to the cutter 24. As previously mentioned, the processed keys are all timed to be in synchronism with the input video signals. The processed keys associated with respective input video signals are multiplied therewith by respective multipliers 408, 410, 412 and 414. The processed background key $K_{Pm1}$ is multiplied by the background video 1 in a background multiplier 416, while the processed background key 2 is multiplied by the background video 2 in a background multiplier 418. The cutter 24 includes bandwidth matching circuits that process the processed keys to match the bandwidth of the key signal to the bandwidth of the video signal. The background video signals, which are multiplied by the corresponding background keys, are simply flat fields of programmable color matte.

The cutter 24 also includes respective cutter key circuits 409, 411, 413 and 415 which process the respective processed keys $K_{P1}$, $K_{P2}$, $K_{P3}$ and $K_{P4}$ before the key signals are applied to the respective multipliers 408, 410, 412 and 414. Each of the cutter key circuits is preferably in the form illustrated in FIG. 10. As is evident from FIG. 3, there is not a one to one correspondence between key signals and luminance and chrominance signals. The cutter key circuits combine and further process the processed key signals to provide cutter key signals appropriate for respective luminance and chrominance signals corresponding to respective discrete locations in the viewing plane. More particularly, processed key signals may be taken to correspond one-to-one to every other luminance byte. For the intermediate luminance bytes, the key bytes on both sides thereof are averaged to provide an appropriate cutter key. For chrominance, two successive chrominance signals, one (R-Y) and the other (B-Y), for the same 300 ns period are cut with the same cutter key formed by averaging four successive key bytes. The latter may be a weighted average.

In FIG. 10 is illustrated a cutter key circuit 409, 411, 413 or 415 for so processing the processed key signals. The key signals are input to a respective tapped key delay circuit 432, which may comprise a shift register. The tapped key delay circuit contains a sequence of input processed keys in the raster scan order in the format shown in FIG. 3D. A plurality, for example, two, of successive key signal bytes are delivered to a luminance key processor 434 which acts for each key signal byte to develop a first combined luminance cutter key signal $K_{CL1}$ corresponding to a current key byte and a second cutter key signal $K_{CL2}$ corresponding to the average of the current key byte and the next key byte in the sequence. At the same time, a plurality, for example, four, of successive key signal bytes are delivered to a chrominance key processor 436 which develops a combined chrominance cutter key signal $K_{CC}$ from the group of four. The two latest bytes of the four are the two earliest bytes in the next group of four.

FIG. 11A illustrates the luminance key assignments, and FIG. 11B illustrates the chrominance key assignments, where C1 and C2 refer to respective chrominance bytes of a pair. A key multiplexer 438 applies the respective cutter key signals to the respective multipliers 408-418 in synchronism with the respective luminance and chrominance bytes of the respective input video signals 1, 2, 3, 4 and background 1 and 2, thereby cutting the respective signals appropriately.

The cut video 1-4 from the multipliers 408-414, and the cut backgrounds 1 and 2 from multipliers 416, 418, are fed to respective 8-bit buses of a bus 502 which forms part of the adder 26. Each set of 8 bit lines of video, e.g., buses 504, 506, 508, 510, are in turn coupled to respective buffer switches 516, 518, 520, 522, and thence to a first adder unit 524. The cut backgrounds 1 and 2 are fed from the buses 512 and 514 directly to the adder unit 524. The same cut video buses 504, 506, 508 and 510 also are coupled respectively to buffer switches 526, 528, 530 and 532 of a second adder unit 534, while buses 512 and 514 couple cut background 1 and 2 directly to the adder unit 534. The adder units 524, 534 supply two composite video output signals simultaneously on output buses 536, 538, for subsequent use by the signal system via the interfaces of FIGS. 1A, 1B.

FIG. 12 depicts an implementation of the adder 26 of FIG. 9, wherein cut video of channels 1-4 and cut backgrounds 1 and 2 are fed via respective buses 420-430 to adder units 524, 534, via adder input buffers, depicted in FIG. 9 as buffer switches 516-522 and 526-532, and by the adder buses 502. Input-enable signals for each channel are fed to each adder unit 524, 534 from a computer interface means 540 which, in turn, is controlled via inputs thereto from the computer 14. Those channels to be added together at any given time are gated into the same adder by active logic states of associated enabling signals. Thus, the adder means 26 may add any two combinations of input video channels at the same time, thereby providing two combines simultaneously. The output of each adder unit is fed to an associated output register 546, 548, whereby the results of either combine can be supplied from the adder 26 of FIG. 12, on any combination of output channels. A restriction imposed by software, in order to protect the output circuits, is that no output channel can supply both combined video signals at the same time. Either output register 546, 548 gates its combined video input to any combination of output channels via buses 542, wherein the outputs are fed to downstream I/O interfaces as depicted, for example, in FIGS. 1A, 1B. Output enable lines from the interface means 540 to each output register, control the output signal gating.

As should be evident, the combiner circuitry of FIGS. 9 and 12 is not all used with the three-dimensional keyer 20. Unless a second keyer 20 is provided, there will be only one composite video signal, and only one background video signal is used to form it. The remainder of the circuitry is useful when the three-dimensional keyer is not used.

The ADO Concentrator combiner includes means for automatically determining the priority of the channels, and thus the spatial order of the video images in a combine on a continuous field-by-field basis. This capability of the ADO Concentrator combiner is not used with the three-dimension Keyer 20.

In the ADO Concentrator combiner the dimness effect integrally includes a light source feature for highlighting selected video images in the composite video image. The value of dimness is recalculated for each channel for each field. The calculation is performed in software by the use of an algorithm which is designed to produce a particular desired visual effect. Many such algorithms may be used.

In the ADO Concentrator combiner, an algorithm has been selected so that channels of video appear to be illuminated to a selected level of ambient light. A parallel light source provides parallel light in a selected direction such that illumination from this source is determined by the apparent orientation of the video image. A value of reflectance is also assigned to each channel to determine the percentage of incident light which is reflected.

If a video image were in an apparent rotation, the dimness resulting from the parallel light source would alternately increase and decrease with changes in relative orientation of the video image. The ambient light level is not dependent on angle. Thus, a selected ambient light level is applied equally to all channels regardless of orientation. Accordingly, for a video image in apparent rotation, the ambient light level does not change. Thus, as a video image appears to rotate, the light level incident thereon varies with the change in angle between the light source vector and a normal to the plane of the video image. The minimum possible light level is equal to the ambient light level and a maximum possible light level is equal to the sum of the ambient and parallel source light levels.

In determining dimness, an additional characteristic, reflectance, is taken into account. Reflectance represents the percentage of incidence light which is reflected by the video image and can be individually selected for each channel. The resulting value of dimness that is supplied in the form of a coefficient is fed to the dimness multipliers of the respective channels Several preferred embodiments of the invention have been shown with particularity. However, various modifications can be made therein within the scope of this invention.

In the keyer and combiner, the background video and background keys are utilized generally in the same manner as the video signals and keys for respective channels. Thus, unless the context requires otherwise, the terms video signals and keys include background video and background keys.

What is claimed is:

1. A system for combining a plurality of respective input video signals, each video signal comprising data samples corresponding to respective discrete loctions on a viewing plane and having associated therewith input key signals corresponding to respective said locations, said system comprising means in respect to each of said input video signals for producing a respective sequence of priority signals corresponding to a respective sequence of said discrete locations, means responsive to said priority signals and respective said input key signals for producing in respect to each input video signal a set of processed key signals corresponding to respective coordinate locations on said viewing plane in said respective sequence, each said set of processed key signals indicating the weighted portion of the respective data samples to be included in a combined video signal at each respective coordinate location, cutter means responsive to said sets of processed key signals for cutting corresponding said data samples to produce corresponding weighted data samples in respect to each input video signal in said respective sequence, and combining means for combining said weighted data samples of said plurality of input video signals for each respective coordinate location on said viewing plane in said respective sequence to produce a combined output video signal.

2. A system according to claim 1 wherein said means for producing said sets of processed key signals includes means for normalizing said processed key signals in the absence of dimming so that the sum of said processed key signals including any background key signal corresponds to an uncut input video signal in the absence of dimming.

3. A system for combining a plurality of respective input video signals, each video signal comprising data samples corresponding to respective discrete locations on a viewing plane, at least one of said video signals including such data samples corresponding to elements of an image lying in an image plane, and having associated therewith input key signals corresponding to respective said locations, said system comprising means in respect to each of said input video signals for producing a respective sequence of depth signals corresponding to the depth coordinates of the respective image plane at the locations corresponding to a respective sequence of said discrete locations, means for comparing depth signals of respective sets of depth signals corresponding to the same locations on said viewing plane in said respective sequence and producing respective weighting signals indicative of the relative depth of respective image planes at the locations corresponding to said discrete locations in said same respective sequence, means responsive to said weighting signals and respective said input key signals for producing in respect to each input video signal a set of processed key signals corresponding to respective coordinate locations on said viewing plane in said respective sequence, each said set of processed key signals indicating the weighted portion of the respective data samples to be included in a combined video signal at each respective coordinate location, cutter means responsive to said sets of processed key signals for cutting corresponding said data samples to produce weighted data samples in respect to each input video signal in said respective sequence, and combining means for combining said weighted data samples of said plurality of said input video signals for each respective coordinate location on said viewing plane in said respective sequence to produce a combined output video signal.

4. A system according to claim 3 wherein said weighting signals correspond to a weighting range extending from zero to full weight, with fractional weight when respective planes are within a predetermined range of depth from each other for respective discrete locations, whereby images in respective planes are blended near their intersection.

5. A system according to claim 4 wherein said means for producing said sets of processed key signals includes means for normalizing said processed key signals in the absence of dimming so that the sum of said processed key signals including any background key signal corresponds to an uncut input video signal in the absence of dimming.

6. A system according to claim 3 wherein said means for producing said sets of processed key signals includes means for normalizing said processed key signals in the absence of dimming so that the sum of said processed key signals including any background key signal corresponds to an uncut input video signal in the absence of dimming.

7. A system for combining a plurality of respective input video signals, each video signal comprising data samples corresponding to respective discrete locations on a viewing plane, at least one of said video signals including such data samples corresponding to elements of an image lying in an image plane, and having associated therewith input key signals corresponding to respective said locations, said system comprising
  means for providing respective sets of plane defining signals for defining each respective said image plane in a three-dimensional coordinate system including a depth coordinate,
  means responsive to each respective set of plane defining signals for producing a respective sequence of depth signals corresponding to the depth coordinates of the respective image plane at the locations corresponding to a respective sequence of said discrete locations,
  means for comparing depth signals of respective sets of depth signals corresponding to the same locations on said viewing plane in said respective sequence and producing respective weighting signals indicative of the relative depth of respective planes at the locations corresponding to said discrete locations in said same respective sequence,
  means responsive to said weighting signals and respective said input key signals for producing in respect to each input video signal a set of processed key signals corresponding to respective coordinate locations on said viewing plane in said respective sequence, each said set of processed key signals indicating the weighted portion of the respective data samples to be included in a combined video signal at each respective coordinate location,
  cutter means responsive to said sets of processed key signals for cutting corresponding said data samples to produce weighted data samples in respect to each input video signal in said respective sequence, and
  combining means for combining said weighted data samples of said plurality of said input video signals for each respective coordinate location on said viewing plane in said respective sequence to produce a combined output video signal.

8. A system according to claim 7 wherein said weighting signals correspond to a weighting range extending from zero to full weight, with fractional weight when respective planes are within a predetermined range of depth from each other for respective discrete locations, whereby images in respective planes are blended near their intersection.

9. A system according to claim 8 wherein said means for producing said sets of processed key signals includes means for normalizing said processed key signals in the absence of dimming so that the sum of said processed key signals including any background key signal corresponds to an uncut input video signal in the absence of dimming.

10. A system according to claim 7 wherein said means for producing said sets of processed key signals includes means for normalizing said processed key signals in the absence of dimming so that the sum of said processed key signals including any background key signal corresponds to an uncut input video signal in the absence of dimming.

11. A system according to any one of claims 1 to 10 including means for reducing at least one of said input key signals to provide transparency of the corresponding image.

12. A system according to any one of claims 3 to 10 wherein said means for producing said sets of processed key signals includes dimming means for reducing the processed key signals of respective said sets of dim at least one corresponding image.

13. A system according to claim 12 including means for reducing at least one of said input key signals to provide transparency of the corresponding image.

14. A method of combining a plurality of respective input video signals, each video signal comprising data samples corresponding to respective discrete loctions on a viewing plane and having associated therewith input key signals corresponding to respective said locations, said method comprising
  in respect to each of said input video signals producing a respective sequence of priority signals corresponding to a respective sequence of said discrete locations,
  utilizing said priority signals and respective said input key signals to produce in respect to each input video signal a set of processed key signals corresponding to respective coordinate locations on said viewing plane in said respective sequence, each said set of processed key signals indicating the weighted portion of the respective data samples to be included in a combined video signal at each respective coordinate location,
  cutting said data samples according to respective said processed key signals to produce corresponding weighted data samples in respect to each input video signal in said respective sequence, and 15. A method according to claim 14 wherein said step of producing said sets of processed signals includes normalizing said processed key signals in the absence of dimming so that the sum of said processed key signals including any backgrond key signal corresponds to an uncut input video signal in the absence of dimming.
  combining said weighted data samples of said plurality of input video signals for each respective coordinate location on said viewing plane in said respective sequence to produce a combined output video signal.

16. A method for combining a plurality of respective input video signals, each video signal comprising data samples corresponding to respective discrete locations on a viewing plane, at least one of said video signals including such data samples corresponding to elements of an image lying in an image plane, and having associated therewith input key signals corresponding to respective said locations, said method comprising in respect to each of said input video signals producing a respective sequence of depth signals corresponding to the depth coordinates of the respective image plane at the locations corresponding to a respective sequence of said discrete locations, comparing depth signals of respective sets of depth signals corresponding to the same locations on said viewing plane in said respective sequence and producing respective weighting signals indicative of the relative depth of respective image planes at the locations corresponding to said discrete locations in said same respective sequence, utilizing said weighting signals and respective said input key signals to produce in respect to each input video signal a set of processed key signals corresponding to respective coordinate locations on said viewing plane in said respective sequence, each said set of processed key signals indicating the weighted portion of the respective data samples to be included in a combined video signal at each respective coordinate location, cutting said data samples according to respective said processed key signals to produce corresponding weighted data samples in respect to each input video signal in said respective sequence, and combining said weighted data samples of said plurality of said input video signals for each respective coordinate location on said viewing plane in said respective sequence to produce a combined output video signal.

17. A method according to claim 16 wherein said weighting signals correspond to a weighting range extending from zero to full weight, with fractional weight when respective planes are within a predetermined range of depth from each other for respective discrete locations, whereby images in respective planes are blended near their intersection.

18. A method according to claim 17 wherein said step of producing said sets of processed signals includes normalizing said processed key signals in the absence of dimming so that the sum of said processed key signals including any background key signal corresponds to an uncut input video signal in the absence of dimming.

19. A method according to claim 16 wherein said step of producing said sets of processed signals includes normalizing said processed key signals in the absence of dimming so that the sum of said processed key signals including any background key signal corresponds to an uncut input video signal in the absence of dimming.

20. A method for combining a plurality of respective input video signals, each video signal comprising data samples corresponding to respective discrete locations on a viewing plane, at least one of said video signals including such data samples corresponding to elements of an image lying in an image plane, and having associated therewith input key signals corresponding to respective said locations, said method comprising providing respective sets of plane defining signals for defining each respective said image plane in a three-dimensional coordinate system including a depth coordinate, utilizing each respective set of plane defining signals to produce a respective sequence of depth signals corresponding to the depth coordinates of the respective image plane at the locations corresponding to a respective sequence of said discrete locations, comparing depth signals of respective sets of depth signals corresponding to the same locations on said viewing plane in said respective sequence and producing respective weighting signals indicative of the relative depth of respective planes at the locations corresponding to said discrete locations in said same respective sequence, utilizing said weighting signals and respective said input key signals to produce in respect to each input video signal a set of processed key signals corresponding to respective coordinate locations on said viewing plane in said respective sequence, each said set of processed key signals indicating the weighted portion of the respective data samples to be included in a combined video signal at each respective coordinate location, cutting said data samples according to respective said processed key signals to produce corresponding weighted data samples in respect to each input video signal in said respective sequence, and combining said weighted data samples of said plurality of said input video signals for each respective coordinate location on said viewing plane in said respective sequence to produce a combined output video signal.

21. A method according to claim 20 wherein said weighting signals correspond to a weighting range extending from zero to full weight, with fractional weight when respective planes are within a predetermined range of depth from each other for respective discrete 22. A method according to claim 21 wherein said step of producing said sets of processed signals includes normalizing said processed key signals in the absence of dimming so that the sum of said processed key signals including any background key signal corresponds to an uncut input video signal in the absence of dimming.

23. A method according to claim 20 wherein said step of producing said sets of processed signals includes normalizing said processed key signals in the absence of dimming so that the sum of said processed key signals including any background key signal corresponds to an uncut input video signal in the absence of dimming. locations, whereby images in respective planes are blended near their intersection.

24. A method according to any one of claims 14 to 23 including reducing at least one of said input key signals to provide transparency of the corresponding image.

25. A method according to any one of claims 16 to 23 including reducing the processed key signals of respective said sets to dim at least one corresponding image.

26. A method according to claim 25 including reducing at least one of said input key signals to provide transparency of the corresponding image.

* * * * *

UNITED STATES PATENT AND TRADEMARK OFFICE
CERTIFICATE OF CORRECTION

PATENT NO. : 4,684,990

DATED : August 4, 1987

INVENTOR(S) : Leslie J. Oxley

It is certified that error appears in the above-identified patent and that said Letters Patent is hereby corrected as shown below:

Column 11, line 4, delete "$K_3$"40" and "$K_m$"40" insert --$K_3'''$-- and --$K_m'''$--;

Column 13, line 53, delete "38" insert --"--;

Column 15, line 54, delete "68" insert --268--;

Column 17, line 7, delete "ke" insert --key--;

Column 22, line 53, insert lines 60, 61, 62, 63 and 64 following line 53;

Column 24, line 39, after "discrete" add --locations, whereby images in respective planes are blended near their intersection.--;

Column 24, lines 52 and 53, delete in their entirety.

Signed and Sealed this

Fifteenth Day of March, 1988

Attest:

DONALD J. QUIGG

Attesting Officer

Commissioner of Patents and Trademarks